US012784534B2

(12) United States Patent
DeMarco et al.

(10) Patent No.: US 12,784,534 B2
(45) Date of Patent: Nov. 3, 2026

(54) GAMING MACHINES AND METHOD FOR DISPLAYING BACKGROUNDS ON MULTIPLE GAMING MACHINES

(71) Applicant: Aristocrat Technologies Australia Pty Limited, North Ryde (AU)

(72) Inventors: Dominic DeMarco, Round Rock, TX (US); Daniel Harden, Palo Alto, CA (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 245 days.

(21) Appl. No.: 18/670,359

(22) Filed: May 21, 2024

(65) Prior Publication Data

US 2024/0321040 A1 Sep. 26, 2024

Related U.S. Application Data

(63) Continuation of application No. 17/818,688, filed on Aug. 9, 2022, now Pat. No. 12,020,530, which is a continuation of application No. 17/083,199, filed on Oct. 28, 2020, now Pat. No. 11,430,288, which is a continuation of application No. 16/433,470, filed on Jun. 6, 2019, now Pat. No. 10,839,639.

(60) Provisional application No. 62/725,554, filed on Aug. 31, 2018.

(51) Int. Cl.
*G07F 17/32* (2006.01)

(52) U.S. Cl.
CPC ...... *G07F 17/3213* (2013.01); *G07F 17/3227* (2013.01)

(58) Field of Classification Search
None
See application file for complete search history.

(56) References Cited

U.S. PATENT DOCUMENTS

D396,888 S 8/1998 Hayashi
D415,211 S 10/1999 Yamaguchi
D435,068 S 12/2000 Muraki (Continued)

OTHER PUBLICATIONS

Australian Search Report for AU2017202972, dated Dec. 5, 2017, 3 pages.

(Continued)

*Primary Examiner* — Ronald Laneau
(74) *Attorney, Agent, or Firm* — Armstrong Teasdale LLP

(57) ABSTRACT

A system is provided. The system includes a plurality of electronic gaming machines, each including a display and a controller. A first electronic gaming machine and a second electronic gaming machine are positioned adjacent to each other laterally. A first display associated with the first electronic gaming machine and a second display associated with the second electronic gaming machine are designed to line up horizontally. A controller associated with at least one of the first electronic gaming machine and the second electronic gaming machine is programmed to control the first display and the second display. The first display and the second display each display a game display area and a background area. The controller is programmed to: a) cause an image to be displayed on the first display; and b) generate and cause to be displayed an animation of the image moving from the first display to the second display.

20 Claims, 26 Drawing Sheets

(56) References Cited

U.S. PATENT DOCUMENTS

| | | | | |
|---|---|---|---|---|
| D435,270 | S | 12/2000 | Healy | |
| 6,319,124 | B1 | 11/2001 | Baerlocher | |
| D572,770 | S | 7/2008 | Seelig | |
| 7,708,640 | B2 | 5/2010 | Burak | |
| 8,066,563 | B1 | 11/2011 | Schultz | |
| 8,075,389 | B1 | 12/2011 | Schultz | |
| D685,033 | S | 6/2013 | Wudtke | |
| 8,506,380 | B2 | 8/2013 | Hughes | |
| D694,833 | S | 12/2013 | Landau | |
| D714,875 | S | 10/2014 | Wudtke | |
| D715,364 | S | 10/2014 | Wudtke | |
| D740,887 | S | 10/2015 | Randazzo | |
| D740,888 | S | 10/2015 | Depalma | |
| D742,975 | S | 11/2015 | Myers | |
| 9,569,914 | B2 | 2/2017 | Kono | |
| 9,646,458 | B2 | 5/2017 | Zielinski | |
| 9,728,031 | B2 | 8/2017 | Schultz | |
| 9,836,922 | B2 | 12/2017 | Jackson | |
| D812,149 | S | 3/2018 | Castro | |
| D819,747 | S | 6/2018 | Castro | |
| D832,356 | S | 10/2018 | Castro | |
| D843,461 | S | 3/2019 | Castro | |
| D843,464 | S | 3/2019 | Castro | |
| D843,465 | S | 3/2019 | Castro | |
| D843,466 | S | 3/2019 | Castro | |
| D843,482 | S | 3/2019 | Holland | |
| D850,536 | S | 6/2019 | Stair | |
| D854,621 | S | 7/2019 | Calhoun | |
| D859,335 | S | 9/2019 | D'Ambrosio | |
| D866,667 | S | 11/2019 | Stair | |
| D866,668 | S | 11/2019 | Ditton | |
| D868,714 | S | 12/2019 | Hodgson | |
| D868,715 | S | 12/2019 | Hodgson | |
| D868,716 | S | 12/2019 | Hodgson | |
| D868,717 | S | 12/2019 | Hodgson | |
| D868,718 | S | 12/2019 | Hodgson | |
| D868,719 | S | 12/2019 | Hodgson | |
| D870,820 | S | 12/2019 | Urban | |
| D871,506 | S | 12/2019 | Castro | |
| D871,507 | S | 12/2019 | Urban | |
| D872,190 | S | 1/2020 | Zedell, Jr. | |
| D873,821 | S | 1/2020 | Song | |
| D873,921 | S | 1/2020 | Bernard | |
| D877,811 | S | 3/2020 | Bernard | |
| D878,477 | S | 3/2020 | Bernard | |
| 10,580,252 | B2 | 3/2020 | Whelan | |
| 10,600,280 | B2 | 3/2020 | Akita | |
| D880,605 | S | 4/2020 | Bussey | |
| D882,280 | S | 4/2020 | Yang | |
| D882,699 | S | 4/2020 | Bernard | |
| D882,700 | S | 4/2020 | Wudtke | |
| D883,393 | S | 5/2020 | Bernard | |
| D887,495 | S | 6/2020 | Bernard | |
| D888,833 | S | 6/2020 | Hodgson | |
| D888,834 | S | 6/2020 | Lee | |
| D890,265 | S | 7/2020 | Johnson | |
| D895,617 | S | 9/2020 | Little | |
| 10,854,494 | B2 | 12/2020 | Charbonnier | |
| 11,151,834 | B2 * | 10/2021 | Urban | F21S 10/02 |
| 11,532,199 | B2 * | 12/2022 | Urban | G07F 17/3211 |
| 2003/0064773 | A1 | 4/2003 | Baerlocher | |
| 2003/0073484 | A1 | 4/2003 | Jo | |
| 2004/0053677 | A1 | 3/2004 | Hughs-Baird | |
| 2004/0178579 | A1 | 9/2004 | Lowell | |
| 2005/0056999 | A1 | 3/2005 | Roemer | |
| 2005/0075162 | A1 | 4/2005 | Duhamel | |
| 2006/0121978 | A1 | 6/2006 | Hornik | |
| 2006/0246977 | A1 | 11/2006 | Cannon | |
| 2006/0258419 | A1 | 11/2006 | Winkler | |
| 2008/0032767 | A1 | 2/2008 | Okada | |
| 2008/0176644 | A1 | 7/2008 | Okada | |
| 2009/0054129 | A1 | 2/2009 | Yoshimura | |
| 2009/0104954 | A1 | 4/2009 | Weber | |
| 2009/0111566 | A1 | 4/2009 | Naicker | |
| 2009/0111569 | A1 | 4/2009 | Yoshizawa | |
| 2010/0048284 | A1 | 2/2010 | Jaffe | |
| 2011/0070940 | A1 | 3/2011 | Jaffe | |
| 2012/0034967 | A1 | 2/2012 | Owen | |
| 2012/0083908 | A1 | 4/2012 | Carpenter | |
| 2012/0202580 | A1 | 8/2012 | Ursic | |
| 2012/0302315 | A1 | 11/2012 | Ikeya | |
| 2013/0040719 | A1 | 2/2013 | Fujisawa | |
| 2013/0109458 | A1 | 5/2013 | Demsetz | |
| 2013/0157751 | A1 * | 6/2013 | Loose | G07F 17/3211 463/25 |
| 2013/0217464 | A1 | 8/2013 | Terdina | |
| 2013/0278875 | A1 | 10/2013 | Kim | |
| 2014/0066198 | A1 | 3/2014 | Robbins | |
| 2014/0080570 | A1 | 3/2014 | Watkins | |
| 2014/0092356 | A1 | 4/2014 | Ahn | |
| 2014/0375936 | A1 | 12/2014 | Park | |
| 2015/0031436 | A1 | 1/2015 | Suda | |
| 2015/0036073 | A1 | 2/2015 | Im | |
| 2015/0116625 | A1 | 4/2015 | Hwang | |
| 2016/0086421 | A1 | 3/2016 | Schultz | |
| 2016/0093138 | A1 | 3/2016 | Munakata | |
| 2016/0093143 | A1 | 3/2016 | Lamb | |
| 2016/0110907 | A1 | 4/2016 | Kelly | |
| 2017/0032625 | A1 | 2/2017 | Nakamura | |
| 2017/0053475 | A1 * | 2/2017 | Borissov | G07F 17/3216 |
| 2018/0071631 | A1 | 3/2018 | Zoloto | |
| 2018/0342129 | A1 | 11/2018 | Wudtke | |
| 2019/0102974 | A1 | 4/2019 | Bussey | |
| 2020/0098227 | A1 | 3/2020 | Hendricks | |
| 2020/0118383 | A1 | 4/2020 | Hodgson | |
| 2020/0357225 | A1 | 11/2020 | Meyer | |
| 2021/0005051 | A1 * | 1/2021 | Shaffer, Jr. | G07F 17/3227 |
| 2021/0043035 | A1 | 2/2021 | Demarco | |
| 2021/0366243 | A1 | 11/2021 | Fong | |
| 2023/0326298 | A1 | 10/2023 | Zeldin | |
| 2023/0360469 | A1 * | 11/2023 | Shaffer, Jr. | G07F 17/3213 |

OTHER PUBLICATIONS

Australian Examination Report for AU2018274893, dated Jan. 17, 2020,2 pages.

Office Action date May 21, 2020 for U.S. Appl. No. 16/433,470 (pp. 1-7).

Notice of Allowance dated Jun. 19, 2020 for U.S. Appl. No. 16/547,154 (pp. 1-10).

Office Action dated Jun. 26, 2020 for U.S. Appl. No. 16/743,595 (pp. 1-6).

Notice of Allowance dated Jul. 27, 2020 for U.S. Appl. No. 16/743,595 (pp. 1-9).

Notice of Allowance dated Sep. 30, 2020 for U.S. Appl. No. 16/433,470 (pp. 1-5).

Office Action dated Nov. 12, 2020 for U.S. Appl. No. 29/661,963 (pp. 1-11).

"Samsung Round Screen", posted Apr. 6, 2015 [Online], [retrieved Nov. 3, 2020], Retrieved from Internet, https://audioxpress.com/news/Samsung-Rounds-out-the-Home-Theater-Experience-with-Curved-Soundbars.

"OLED Screens", posted Jan. 6, 2016 [Online], [retrieved Nov. 4, 2020], Retrieved from Internet, https://finance.yahoo.com/news/lg-s-see-through-rollable-1337718221365302.html.

Office Action (Non-Final Rejection) dated Mar. 28, 2022 for U.S. Appl. No. 17/083,199 (pp. 1-7).

Office Action dated Jun. 21, 2021 for U.S. Appl. No. 29/661,963 (pp. 1-7).

Office Action dated Dec. 24, 2021 for U.S. Appl. No. 29/661,963 (pp. 1-6).

Notice of Allowance dated Apr. 27, 2022 for U.S. Appl. No. 29/661,963 (pp. 1-5).

Office Action (Notice of Allowance and Fees Due (PTOL-85)) dated May 25, 2022 for U.S. Appl. No. 17/083,199 (pp. 1-5).

Notice of Allowance dated Mar. 27, 2024 for U.S. Appl. No. 17/818,688 (pp. 1-10).

(56) References Cited

OTHER PUBLICATIONS

Australina Examination Report No. 1 issued in App. No. AU2019222894, dated Jun. 28, 2024, 6 pages.

* cited by examiner

GAMING MACHINES AND METHOD FOR DISPLAYING BACKGROUNDS ON MULTIPLE GAMING MACHINES

CROSS REFERENCE TO RELATED APPLICATIONS

This application is a continuation of and claims priority to U.S. patent application Ser. No. 17/818,688, filed Aug. 9, 2022, which is a continuation of U.S. patent application Ser. No. 17/083,199, now U.S. Pat. No. 11,430,288, filed Oct. 28, 2020, which is a continuation of and claims priority to U.S. patent application Ser. No. 16/433,470, now U.S. Pat. No. 10,839,639, filed Jun. 6, 2019, which claims priority to U.S. Provisional Application No. 62/725,554, filed Aug. 31, 2018, the contents and disclosures of which are incorporated by reference herein in their entireties.

TECHNICAL FIELD

The field of disclosure relates generally to electronic gaming, and more particularly to an electronic gaming machine and method of operation thereof that allows a background display to flow through multiple display screens associated with multiple electronic gaming machines.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance. When the player is done, he/she cashes out the credit balance (typically by pressing a cash out button to receive a ticket from the ticket printer 222). The ticket may be "cashed-in" for money or inserted into another machine to establish a credit balance for play by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "pay-table" that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

Many conventional gaming machines are independent of the other gaming machines that are around them.

BRIEF DESCRIPTION

In one aspect, a system is provided. The system includes a plurality of electronic gaming machines including a first electronic gaming machine and a second electronic gaming machine. Each electronic gaming machine of the plurality of electronic gaming machines including a display and a controller. The first electronic gaming machine and the second electronic gaming machine are positioned adjacent to each other laterally. A first display associated with the first electronic gaming machine and a second display associated with the second electronic gaming machine are designed to line up horizontally. The system also includes a controller associated with at least one of the first electronic gaming machine and the second electronic gaming machine. The controller programmed to control the first display and the second display. The first display and the second display each display a game display area and a background area. The controller is programmed to cause an image to be displayed on the first display. The controller is also programmed to generate and cause to be displayed an animation of the image moving from the first display to the second display.

In another aspect, a game controller is provided. The game controller includes at least one processor in communication with at least one memory device. The game controller is in communication with a plurality of electronic gaming machines. Each electronic gaming machine of the plurality of electronic gaming machines includes a display including a background and a game display area. The game controller is programmed to determine a plurality of relative locations for the plurality of electronic gaming devices. The game controller is also programmed to generate a plurality of instructions for displaying an animation on the plurality of backgrounds of the plurality of displays. The game controller is further programmed to transmit the corresponding plurality of instructions to each of the plurality of electronic gaming machines.

BRIEF DESCRIPTION OF THE DRAWINGS

An example embodiment of the subject matter disclosed will now be described with reference to the accompanying drawings.

DETAILED DESCRIPTION

In the exemplary embodiment, a plurality of electronic gaming machines each include large display screens. The plurality of electronic gaming machines are positioned adjacent to each other. The large display screens display an electronic game being displayed in the foreground and a background animation. The plurality of electronic gaming machines are configured so that the background animation is continuous over the plurality of associated display screens. This is configured such that an image may appear on a first display screen of the plurality of display screens and appear to travel from the first display screen to an adjacent display screen. In some embodiments, the background animation of the electronic gaming machines is controlled by a central controller. In other embodiments, the plurality of electronic gaming machines are in communication with each other to control the background animation. In some embodiments, the plurality of electronic gaming machines are permanently attached, such as all being attached to the same base. In other embodiments, the plurality of electronic gaming machines are modular such that each electronic gaming machine is physically independent of the other electronic gaming machines. In the exemplary embodiment, the display screens of the electronic gaming machines are convex at a 90 degree angle, so that images may flow around the corner. For example, a set of two machines side-by-side may have two screens that provide 180 degrees of images and may be used as an end cap on a bank of machines. In another example, four machines may be placed together to generate a 360 degree set of machines that may be walked around and show a single continuous image flowing around the display screens.

Figure 1:
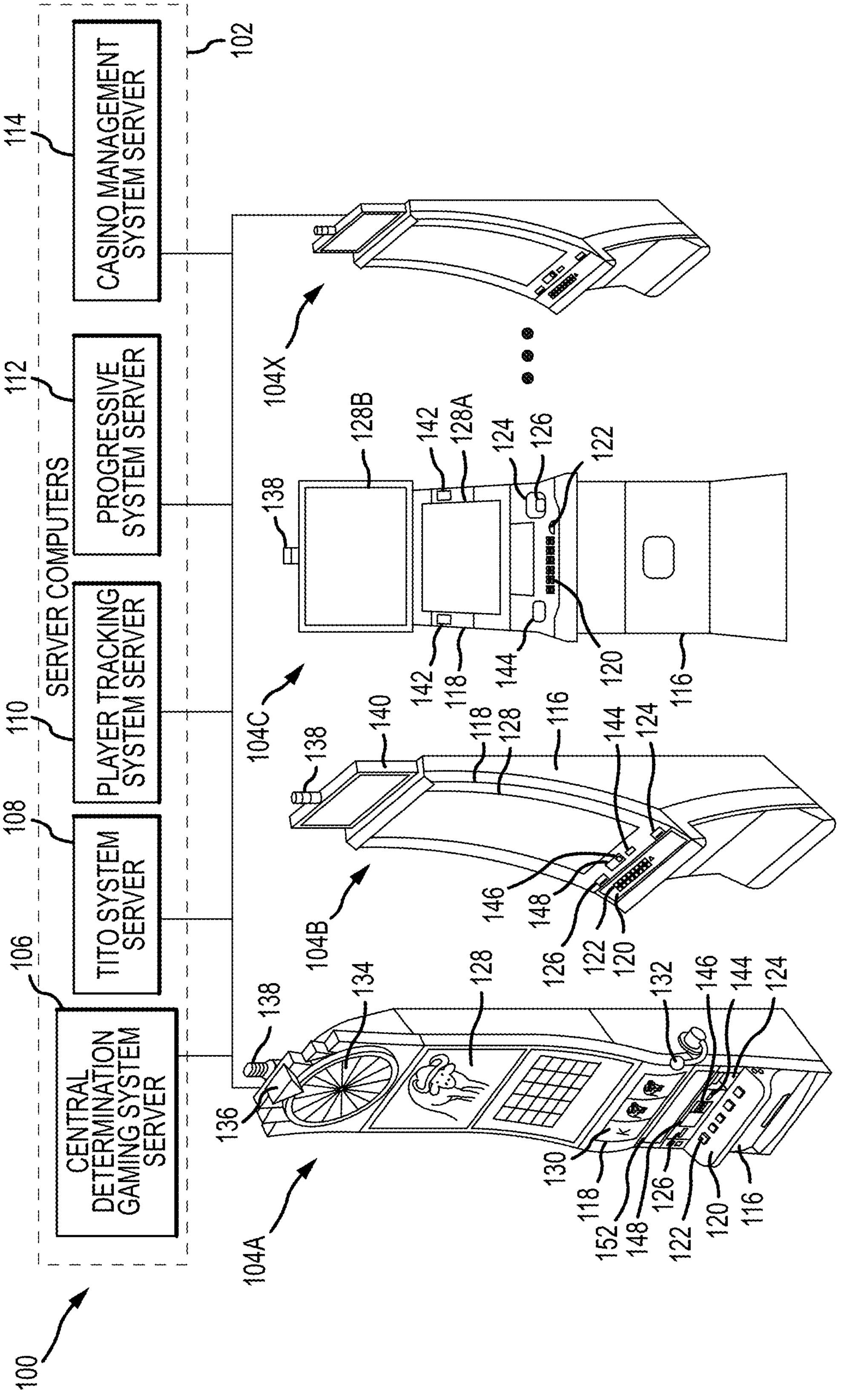
FIG. 1 is an exemplary diagram showing several EGMs networked with various gaming related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
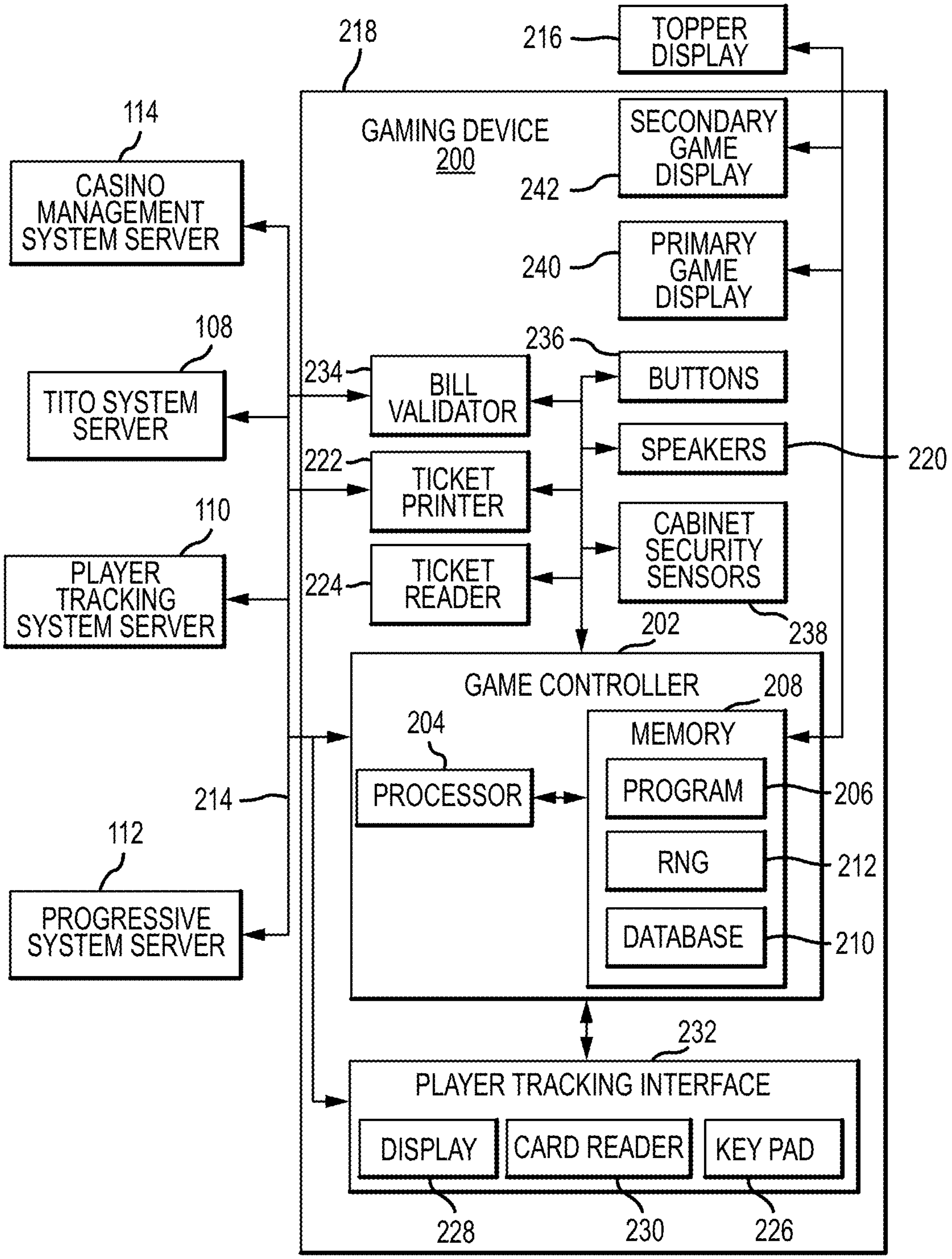
FIG. 2 is a block diagram showing various functional elements of an exemplary EGM as shown in FIG. 1.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide new technology in that they control multiple interconnected EGMs to coordinate a background display over the interconnected EGMs. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
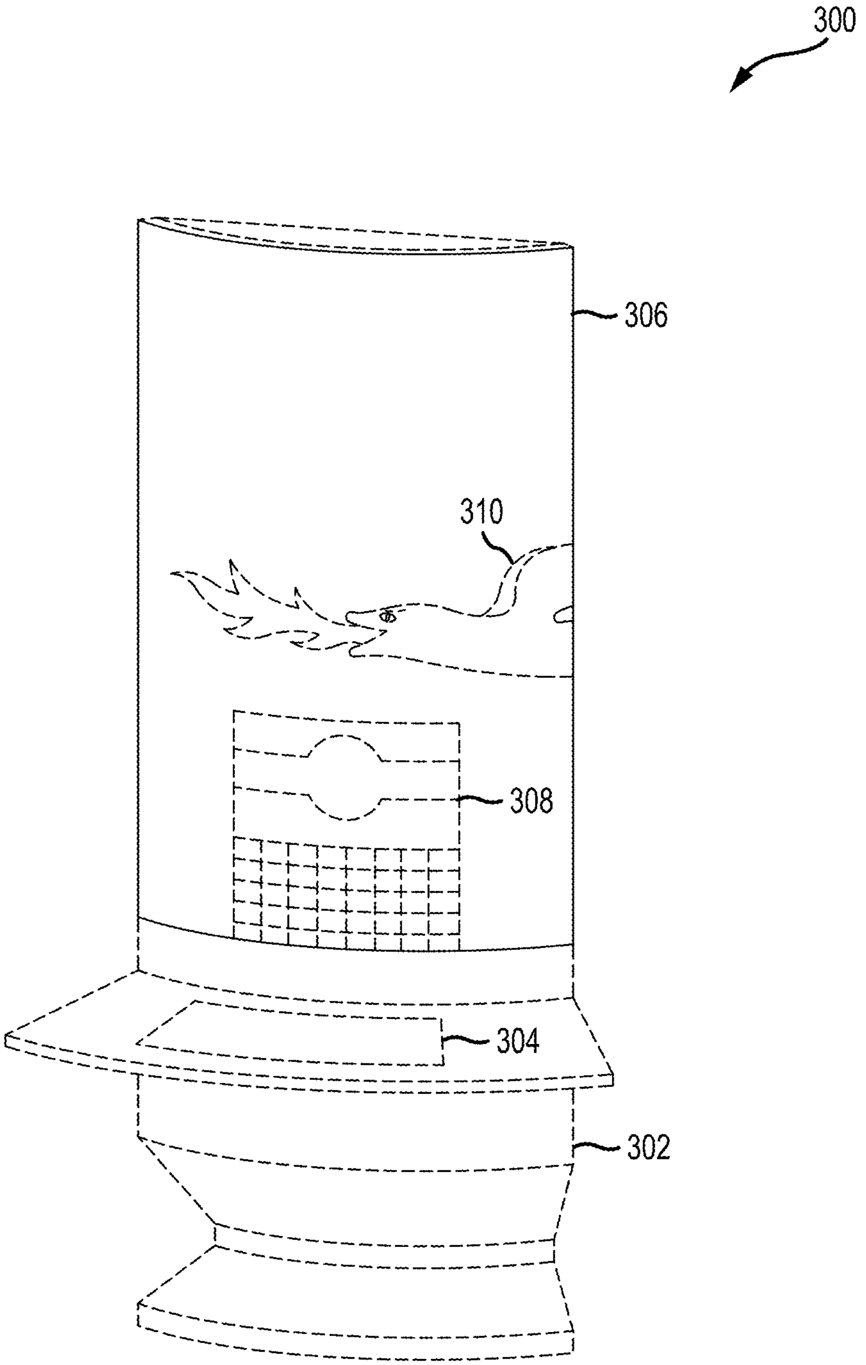
FIG. 3 is an exemplary diagram showing an individual EGM as shown in FIG. 1 in accordance with one embodiment of this disclosure.

FIG. 3 is an exemplary diagram showing an individual EGM 300 as shown in FIG. 1 in accordance with one embodiment of this disclosure. In some embodiments, EGM 300 is similar to gaming device 200 shown in FIG. 2 or gaming devices 104A-104X.

The individual EGM 300 includes a stand 302, an interactive console 304, and a display screen 306. The display screen 306 displays a game display area 308 and a background that may include at least one animation 310. In some embodiments, the game display area 308 and the background are coordinated and controlled separately, such as with Picture-in-Picture. In these embodiments, changes to the background do not affect the game display area 308 and the reverse. In some embodiments, game display area 308 may include both primary game display 240 and secondary game display 242 (both shown in FIG. 2).

Figure 4:
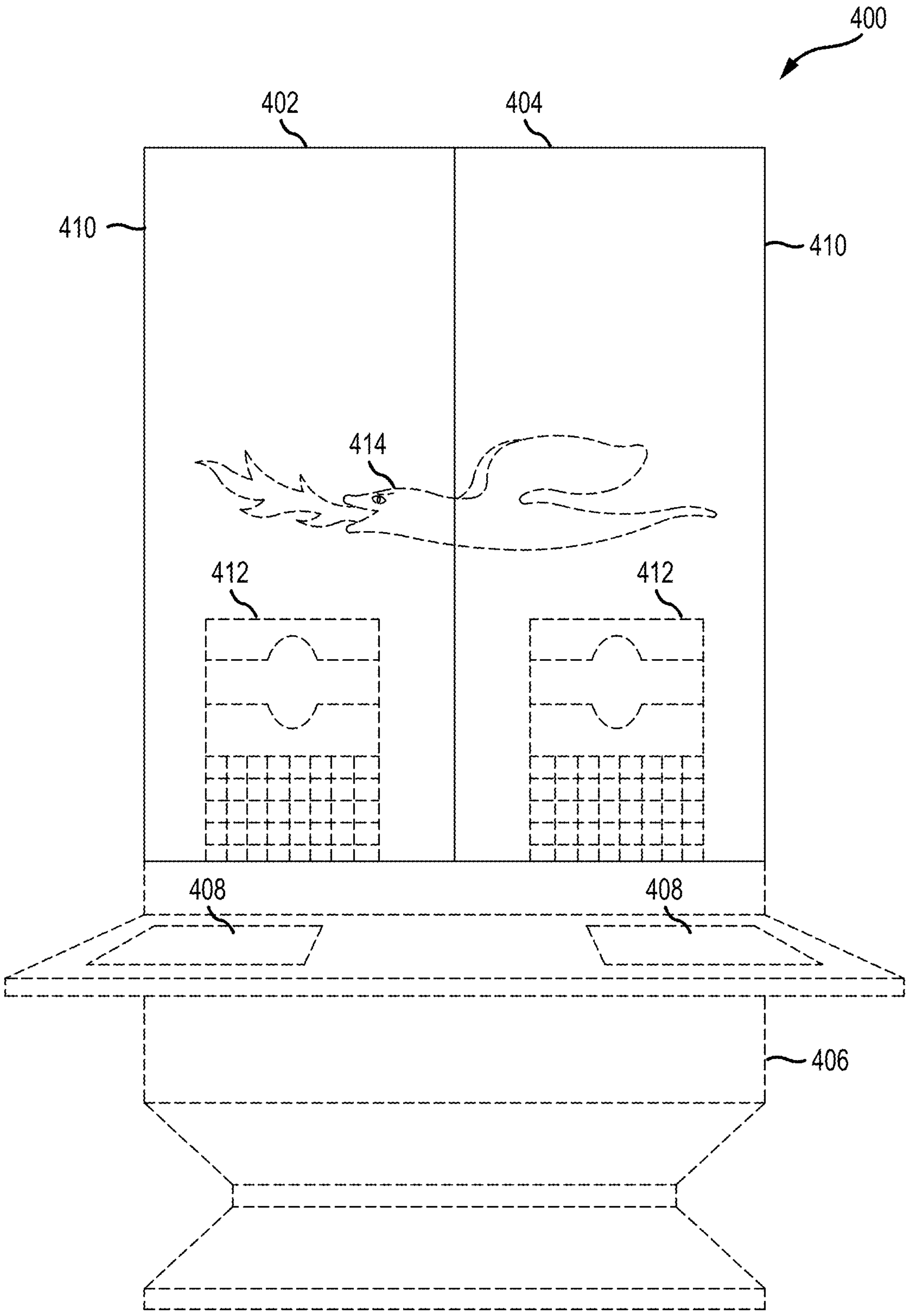
FIG. 4 is an exemplary diagram showing an exemplary configuration of connected EGMs as shown in FIG. 3 in accordance with one embodiment of this disclosure.
Figure 5:
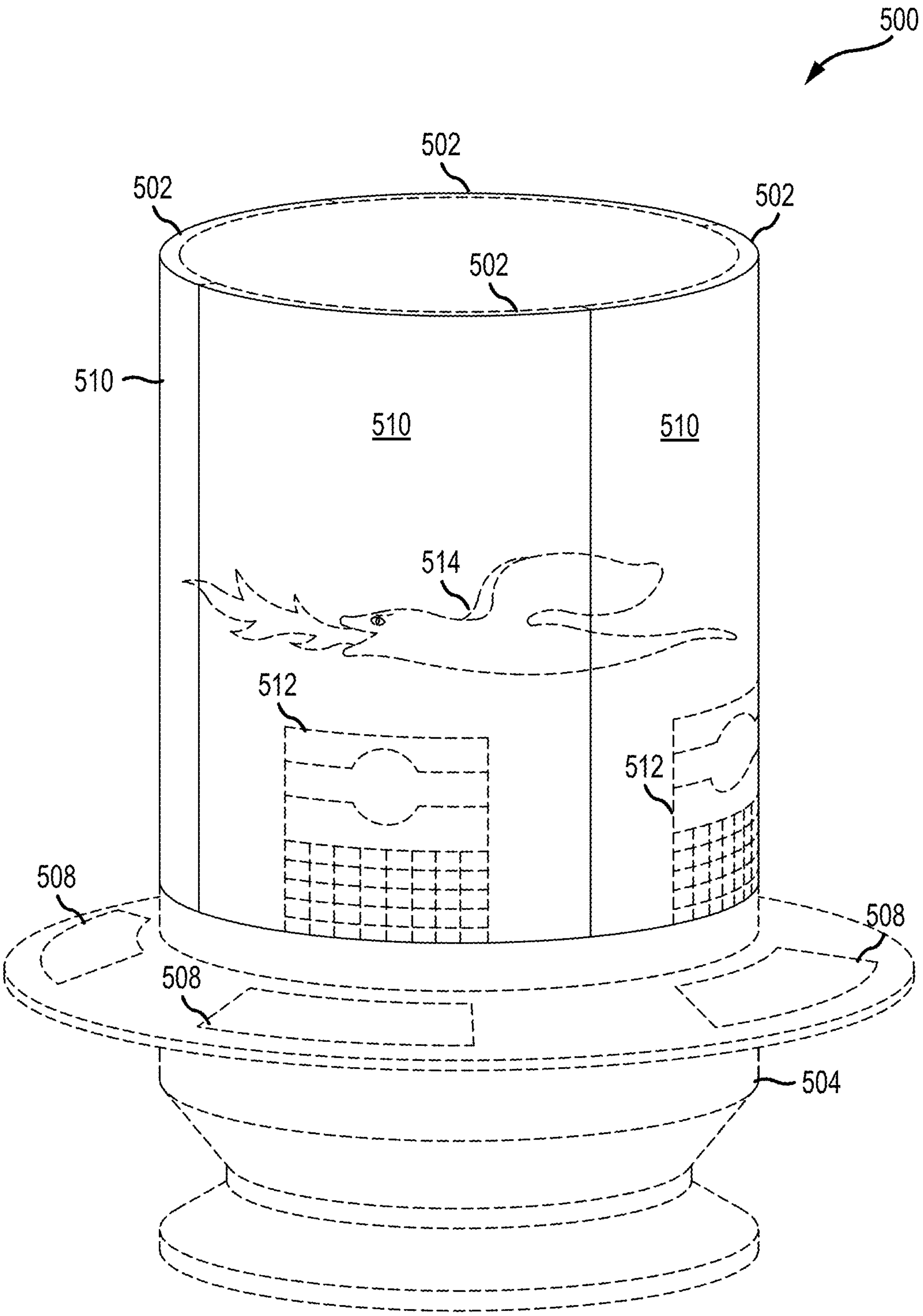
FIG. 5 is an exemplary diagram another exemplary configuration of connected EGMs as shown in FIG. 3 in accordance with one embodiment of this disclosure.
Figure 9:
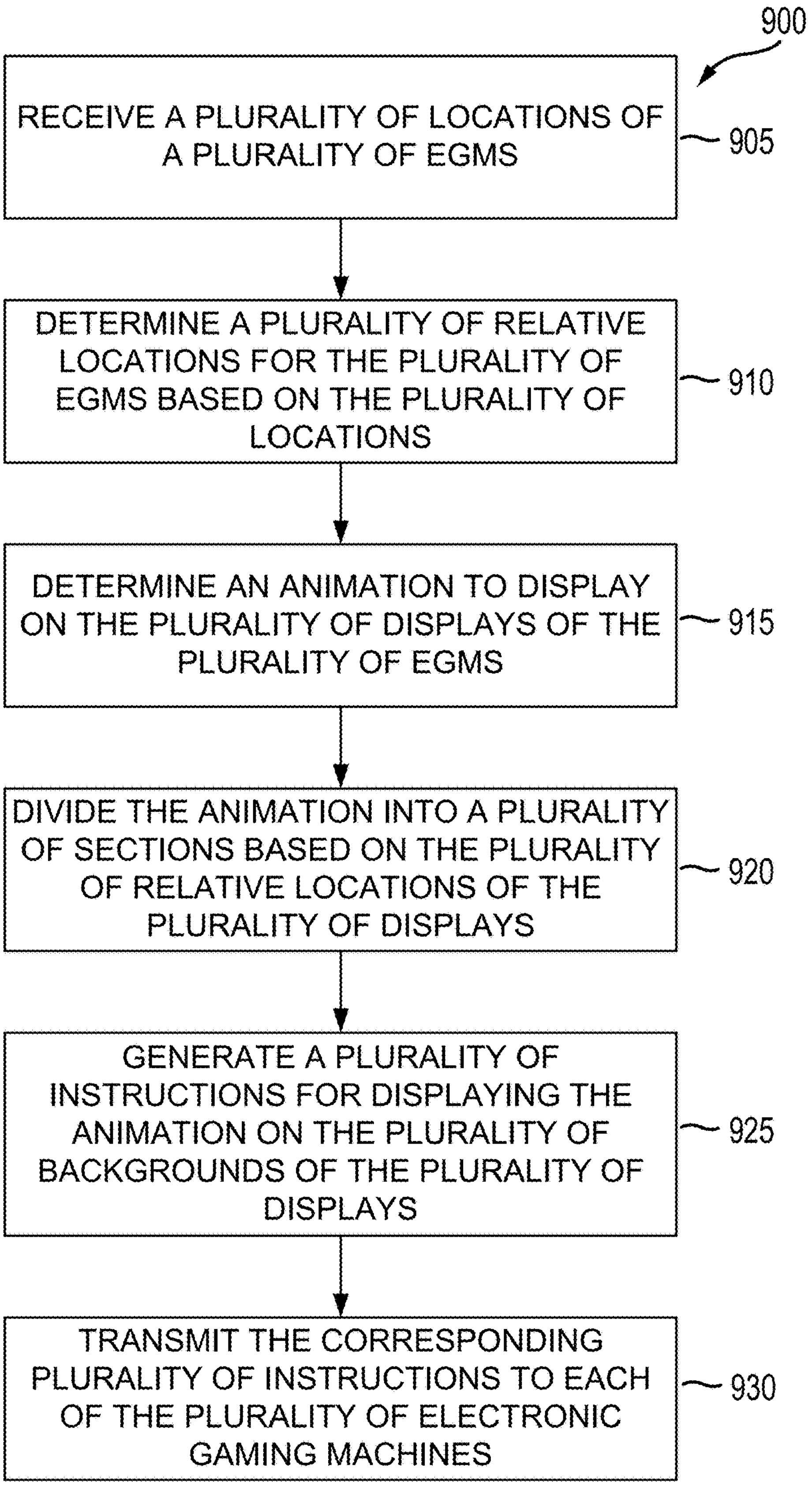
FIG. 9 is an exemplary process of executing an animation on a plurality of EGMS shown in FIG. 3.

In the exemplary embodiment, the display screen 306 is a high-resolution LCD with LED backlighting. In other embodiments, the display screen 306 is a plasma, LED, or OLED panel. The display screen 306 is convex as shown in FIGS. 3 and 9-11. This allows the display screen to be viewed at a plurality of angles. As shown in FIG. 9, the individual EGM 300 is design to be at a 90 degree angle. In some embodiments, the individual EGM 300 is designed to be modular, so that a plurality of individual EGMs 300 may fit together, such as shown in FIGS. 4 and 5. In other not shown embodiments, the individual EGMs 300 are designed to be fit together at different angles. For example, the individual EGMs 300 may be configured to each cover a 60 degree angle. Therefore, three EGMs would be used as an endcap and cover 180 degrees. These different angles may be required to be different sizes from the 90 degree EGMs to allow for sufficient play space for each player. While the display screens 306 shown in these figures are convex, concave display screens may also be used in other embodiments, such as in an inner corner of a plurality of EGMs 300 in an 'L' configuration.

In the exemplary embodiment, the interactive console 304 is positioned on a shelf 312 may include one or more features to allow a player to play a wagering game, such as, but not limited to, buttons 236, a bill validator 234, ticket printer 222, and a ticket reader 224 (all shown in FIG. 2). In some other embodiments, the interactive console 304 and the shelf 312 may be a display screen, wherein the interactive console 304 is a picture-in-picture display or a cut-out, so that images and animations may be displayed on the display on the shelfs 312. For example, the display screen on the shelf 312 may display dragons flying from one EGM shelf to another.

In the exemplary embodiment, the EGM 300 is configured to be placed adjacent to other EGMs 300 and to coordinate the background images and animations between the adjacent EGMs 300 to allow for continuous images and animations. In some further embodiments, the adjacent EGMs 300 are physically locked together to ensure that the display screens 306 are properly lined up. In some embodiments, the images and animations are related to the theme of the associated wagering game. The images and animations may change based on gameplay. The images and animations may also change when the EGMs 300 are in an "attract" mode.

In some embodiments, the game display area 308 is a stepper reel assembly that is a cut-out from display screen 306. In these embodiments, the game display area 308 may comprise a flat surface, such as glass. Behind the flat surface are situated stepper (mechanical) reels for playing the wagering game. In these embodiments, the game display area 308 would be detachable for servicing, such as releasing with a latch situated below. In some embodiments, the game display area 308 and stepper reels are placed in a recess in the display screen 306 that includes drawer slides for servicing. In these embodiments, the display of the background and the animation 310 would be unaffected by the cut-out and game display area 308. Examples of these embodiments with stepper reel assemblies are shown in FIGS. 20-25.

In some embodiments, the background and/or animation 310 may include bonus information, advertising, or promotional information. For example, the game display area 308 may display an advertisement for a nearby restaurant and point to the restaurant. Some of the promotional information may be tailored to the individual players that are actively playing the EGM 300. In some of these embodiments, the bonus information, advertisement, or promotional information may be provided by a separate server, such as the casino management system server 114 (shown in FIG. 1). In some embodiments, the advertising may be targeted towards the player at the machine, who may be identified via the player reward card.

In some embodiments, the display screen 306 is divided up into multiple sections in addition to the section dedicated to the game display area 308. For example, a first section may display progressive jackpot information provided from a remote gaming server 102 (shown in FIG. 1) associated with the progressive jackpot. Another section may show advertising from an advertising server 102, which may be associated with the casino, or location of the EGM, or the advertising server 102 may provide more general advertisements. A different section may show images or animations 310 associated with the theme of the EGM. Any of these sections may flow over multiple display screens 306. For example, the progressive jackpot numbers may travel across all of the display screen 306 of all of the EGMs 300 in a row, bank, end cap, or circular configuration.

FIG. 4 is an exemplary diagram showing an exemplary configuration 400 of two connected EGMs 300 as shown in FIG. 3 in accordance with one embodiment of this disclosure. In configuration 400, there are two individual EGMS 402 and 404 that are positioned adjacent to each other. In some embodiments, EGMS 402 and 404 are individual EGMs 300 that are independent and that are positioned adjacent to each other. In other embodiments, EGMs 402 and 404 are manufactured to be adjacent to each other on a single stand 406. Each EGM 402 and 404 includes an interactive console 408, which may be similar to interactive console 304 (shown in FIG. 3), and a display screen 410, which may be similar to display screen 306 (shown in FIG. 3). Each display screen 410 includes a game display area 412 for the corresponding EGM and a background that includes at least one animation 414. In some embodiments, game display area 412 may include both primary game display 240 and secondary game display 242 (both shown in FIG. 2)

In configuration 400, the display screens 410 of the two EGMs are curved to generate a half circle or 180 degrees. This would allow two players to play the associated wagering game. The EGMs in configuration 400 may be set-up as the end cap for a row of other EGMs.

In the exemplary embodiment, EGMs 402 and 404 are in communication so that the background and animation 414 shown on each corresponding display screen 410 is coordinated. In some embodiments, a background animation 414 may be shown on both display screens 410 simultaneously and may travel between the two display screens 410. For example, a dragon or a spaceship may be seen flying from the display screen 410 associated with EGM 404 to the display screen 410 associated with EGM 402. As shown in FIG. 4, different portions of the animation 414 may be shown on the various display screens 410. For example, the front of the spaceship or dragon may appear on the display screen 410 for EGM 402, while the back end of the spaceship or dragon may appear on the display screen 410 for EGM 404.

FIG. 5 is an exemplary diagram another exemplary configuration 500 of connected EGMs 300 as shown in FIG. 3 in accordance with one embodiment of this disclosure. In configuration 500, four EGMs 502 are positioned in a circle configuration. In some embodiments, the four EGMs 502 are part of a single unit with a single display stand 504. In other embodiments, the four EGMs 502 are individual EGMs 300 that are positioned in a circular arrangement. In still other embodiments, the four EGMs 502 are two sets of paired EGMs, such as shown in configuration 400 in FIG. 4. Each of the four EGMs 502 includes an interactive console 508, which may be similar to interactive console 304 (shown in FIG. 3), and a display screen 510, which may be similar to display screen 306 (shown in FIG. 3). Each display screen 510 includes a game display area 512 for the corresponding EGM 502 and a background that includes at least one animation 514. In some embodiments, game display area 512 may include both primary game display 240 and secondary game display 242 (both shown in FIG. 2)

In configuration 500, the display screens 510 of the four EGMs 502 are curved to generate a full circle or 360 degrees. This would allow four players to play the associated wagering game. In other configurations, other numbers of players may be able to play in the circular configuration, such as 6, in the case of 60 degree EGMs 300 or 3 in the case of 120 degree EGMs 300.

In the exemplary embodiment, the EGMs 502 are in communication so that the background and animation 514 shown on each corresponding display screen 510 is coordinated. In some embodiments, a background animation 514 may be shown on multiple display screens 510 simultaneously and may travel between the four display screens 510. For example, a dragon or a spaceship may be seen flying from the display screen 510 associated with one EGM 502 to the display screen 510 associated with another EGM 502. As shown in FIG. 5, different portions of the animation 514 may be shown on the various display screens 510. For example, the front of the spaceship or dragon may appear on the display screen 510 for one EGM 502, while the back end of the spaceship or dragon may appear on the display screen 510 for another EGM 502.

In the exemplary embodiment, the game display area 512 only covers a portion of the total display screen 510. The rest of the display screen 510 is covered by background and animations 514. In some embodiments, the background and animations 514 are based on the game play. These images and animations 514 may be based on the game as a whole or the images and animations 514 may be based on the current events in the game. For example, the background may include a progressive jackpot indicator that covers multiple display screens 510. The progressive jackpot indicator may rotate around the display screens 510. The display screens 510 may also show items floating up to the progressive jackpot indicator based on game play. In addition, the display screens 510 may also show an animation of money being funneled or dumped into a particular gaming area if one of the EGMs 502 wins one of the progressive jackpots. In some embodiments, the display screens 510 may also display advertising provided by a remote server 102 (shown in FIG. 1).

As shown in configuration 500, the plurality of electronic gaming machines 502 are positioned laterally in a circular configuration so that the animation 514 may travel from a first display 510 the across all of the plurality of displays 510 and return to the first display 510.

Figure 6:
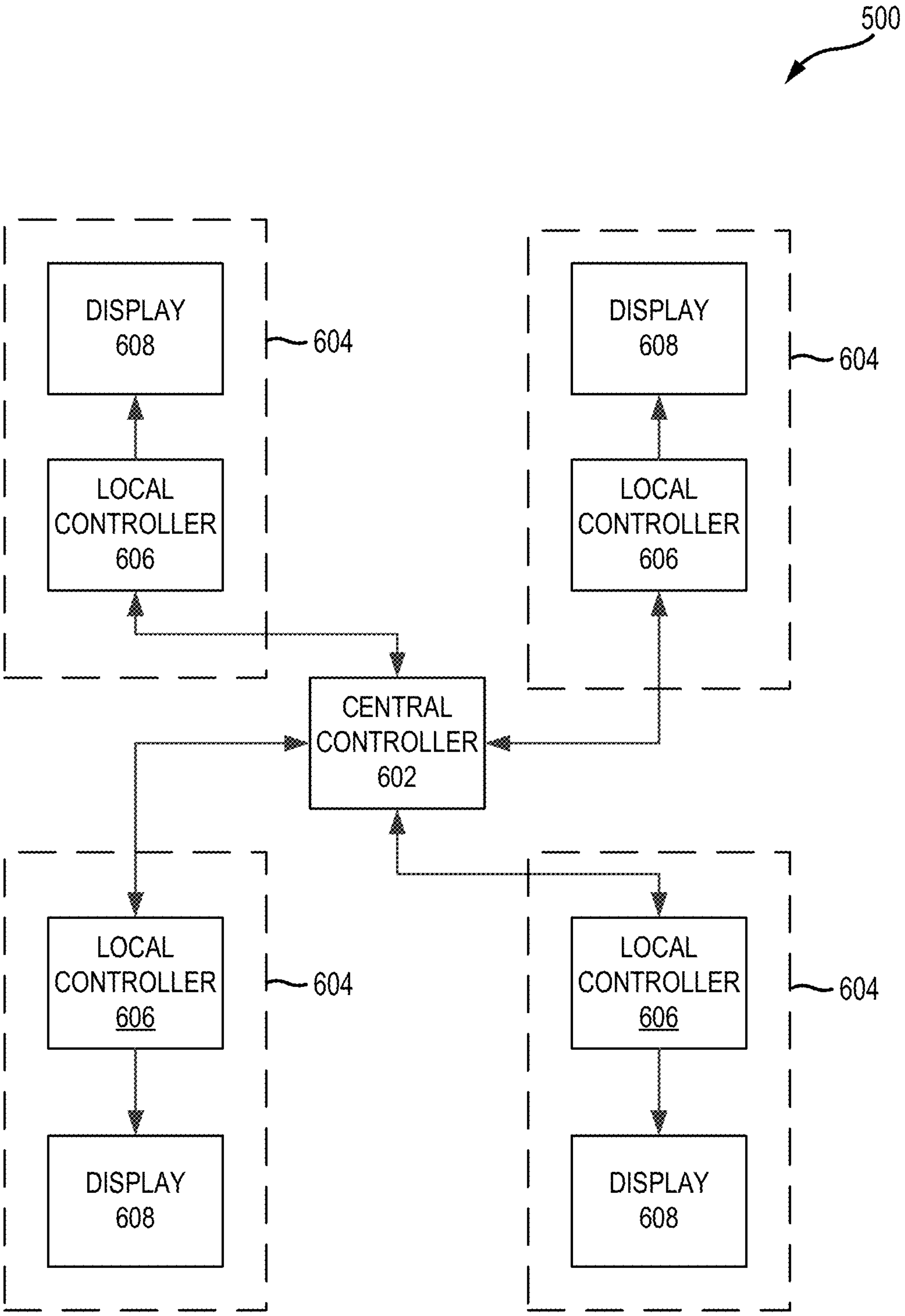
FIG. 6 is a block diagram showing various functional elements of an example of the exemplary configuration of connected EGMs as shown in FIG. 5.

FIG. 6 is a block diagram showing various functional elements of an example of the exemplary configuration 500 of connected EGMs 604 as shown in FIG. 5. In this embodiment, four EGMs 604, which may be similar to EGMs 502 (shown in FIG. 5), are connected to a central controller 602. Each EGM 604 includes a local controller 606 and a display 608, which may be similar to display 510 (shown in FIG. 5).

In some embodiments, the central controller 602 is configured to instruct the local controllers 606 on how to display the background. In these embodiments, the central controller 602 coordinates the locations of the different pixels and objects in the background including the animation. Then the central controller 602 determines which display 608 is to display which objects and/or pixels and instructs the local controller 606 what to display in the various corresponding displays 608. In some of these embodiments, the local controller 606 executes the wagering game and instructs the display 608 how to display the wagering game, while receiving the information from the central controller 602 on the information to display for the background area of the displays 608. In other embodiments, the central controller 602 also controls the gameplay of the EGMs 604 and the local controller handles interpreting the instructions from the central controller 602 to be display on the corresponding display 608.

In some embodiments, central controller 602 may be one of, or at least in communication with one of, casino management system 114, TITO system server 108, player tracking system 110, and progressive system server 112 (all shown in FIG. 1). For example, central controller 602 may receive information from progressive system server 112 to display and the central controller 602 then integrates that information into the display. In some further embodiments, the central controller 602 and a separate server 102 each control different portions of he displays 608. For example, an advertising server (not shown) may control a top section of the displays 608 and the central controller 602 controls the rest of the displays 608. In still further embodiments, the central controller 602 shares control of the rest of the displays 608 with the local controllers 606. In some embodiments, local controller 606 may be game controller 202

(shown in FIG. 2). In some embodiments, display 608 may include both primary game display 240 and secondary game display 242.

While only four EGMs 604 are shown in FIG. 6, one skilled in the art would understand that any number of EGMs 604 may be connected to one or more central controllers 602 to coordinate the images being displayed on the various displays 608.

In some embodiments, the central controller 602 is physically located near the EGMs 604. In these embodiments, each EGM 604 may be directly wired into a specific port on the central controller 602, so that the central controller 602 knows which EGM 604 is to be positioned where based on the corresponding port. In other embodiment, the central controller 602 is remote from the EGMs 604 and communicates with the EGMs 604 via a wired or wireless connection, such as through a local area network (LAN).

Figure 7:
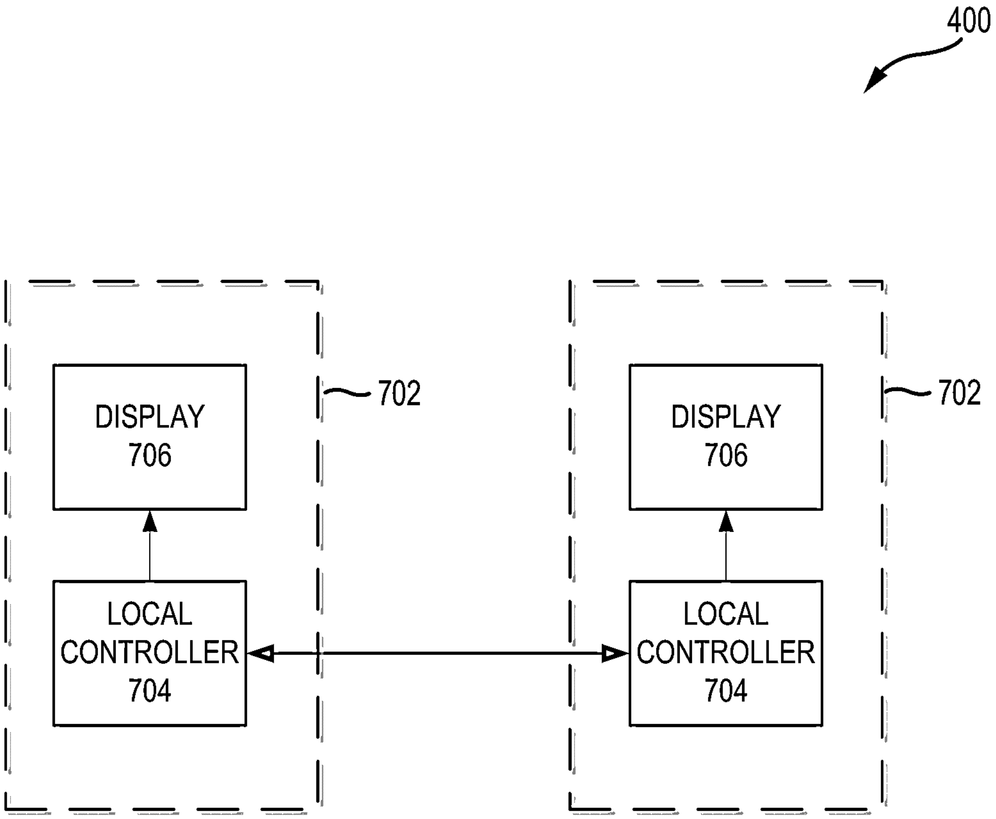
FIG. 7 is a block diagram showing various functional elements of an example of the exemplary configuration of connected EGMs as shown in FIG. 4.

FIG. 7 is a block diagram showing various functional elements of an example of the exemplary configuration 400 of connected EGMs 702 as shown in FIG. 4. In this embodiment, two EGMs 702, which may be similar to EGMs 402 and 404 (shown in FIG. 4), are connected to each other. Each EGM 702 includes a local controller 704 and a display 706, which may be similar to display 410 (shown in FIG. 4).

In this configuration, the local controllers 704 of the two EGMs 702 are in communication about how to display the background. In these embodiments, the two local controllers 704 coordinate the locations of the different pixels and objects in the background including the animation. Then two local controllers 704 determine which display 706 is to display which objects and/or pixels and instructs the corresponding display 608 on what to display. In some of these embodiments, the local controller 704 executes the wagering game and instructs the display 706 how to display the wagering game, while receiving the information from the other local controller 704 on the information to display for the background area of its displays 706. In some embodiments, one local controller 704 is master controller and the other local controller 704 is a slave controller.

In some embodiments, local controller 704 may be game controller 202 (shown in FIG. 2). In some embodiments, display 706 may include both primary game display 240 and secondary game display 242.

While only two EGMs 702 are shown in FIG. 7, one skilled in the art would understand that any number of EGMs 702 may be connected to each other to coordinate the images being displayed on the various displays 706.

Figure 8:
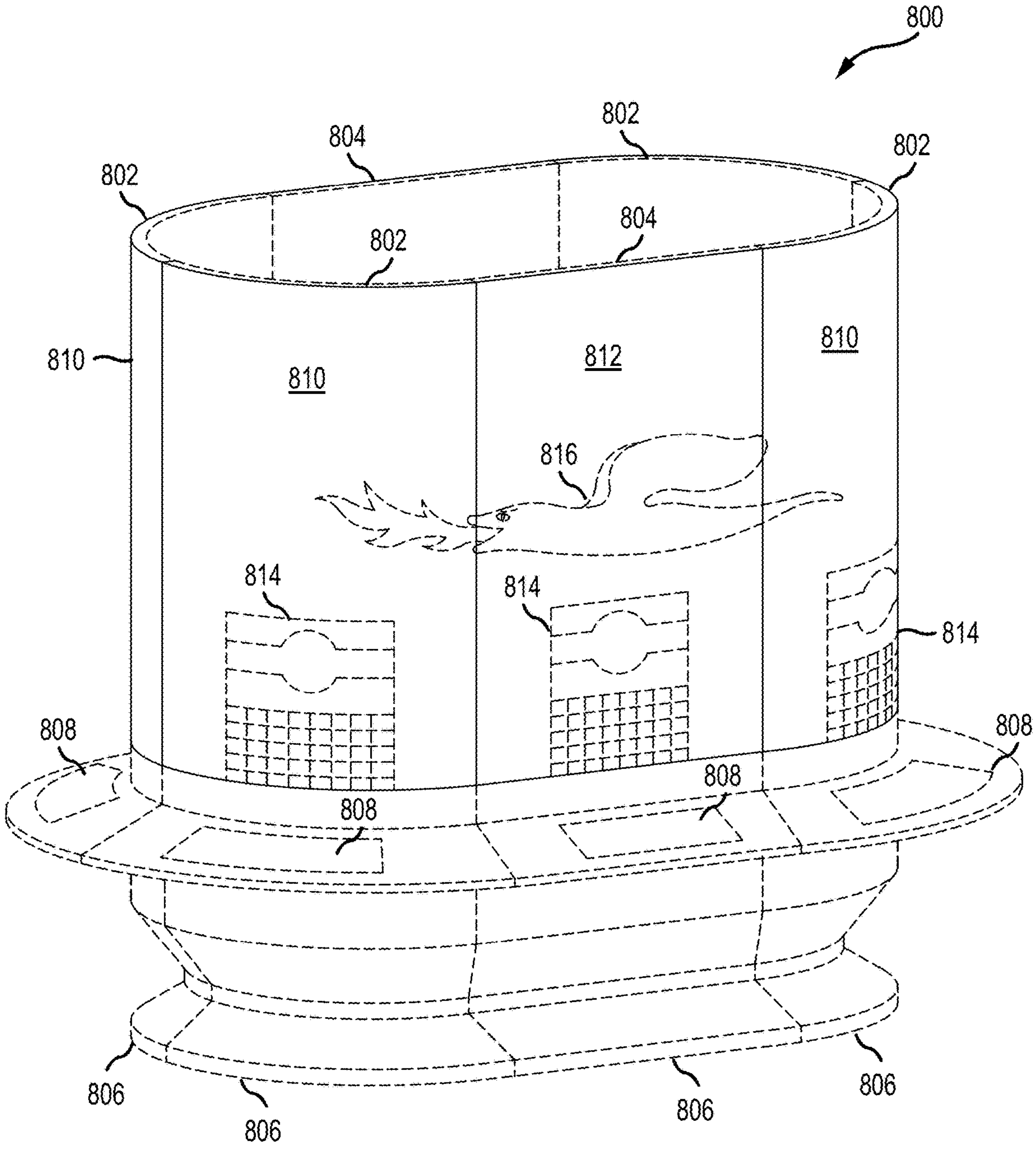
FIG. 8 is an exemplary diagram a further exemplary configuration of connected EGMs as shown in FIG. 3 in accordance with one embodiment of this disclosure.

FIG. 8 is an exemplary diagram a further exemplary configuration 800 of connected EGMs 300 as shown in FIG. 3 in accordance with one embodiment of this disclosure. In configuration 800, six EGMs 802 and 804 are positioned in an aisle configuration. In the exemplary embodiment, there are four 90 degree EGMs 802, which may be similar to EGM 300 (shown in FIG. 3). These EGMS 802 are connected by EGMs 804. The primary difference between EGMs 802 and 804 are whether the corresponding EGM is curved or flat. EGMs 802 include curved stands 806, curved interactive consoles 808, and curved display screens 810. Flat EGMs 804 include non-angled stands 806, non-angled interactive consoles 808, and flat display screens 812.

In some embodiments, each of EGM 802 and EGM 804 are individual devices and are manually positioned in configuration 800. In other embodiments, the four EGMs 802 are two sets of paired EGMs, such as shown in configuration 400 in FIG. 4. While only two flat EGMs 804 are shown, any number of flat EGMs may be placed in between the curved EGMs 802 to achieve the desired shape or configuration. For example ten flat EGMs 804 could be placed in between two sets of two curved EGMs 802 to create a long aisle. In another configuration, three flat EGMs 804 could be placed between each pair of curved EGMs 802 to make a large square or rectangle.

The interactive consoles 808 may be similar to interactive console 304 (shown in FIG. 3), and the display screens 810 may be similar to display screen 306 (shown in FIG. 3). Each display screen 810 and 812 includes a game display area 814 for the corresponding EGM 802 and 804 and a background that includes at least one animation 816.

In the exemplary embodiment, the EGMs 802 and 804 are in communication so that the background and animation 816 shown on each corresponding display screen 810 and 812 is coordinated. In some embodiments, a background animation 816 may be shown on multiple display screens 810 and 812 simultaneously and may travel between the multiple display screens 810 and 812. For example, a dragon or a spaceship may be seen flying from the display screen 810 associated with one EGM 802 to the display screen 812 associated with another EGM 802. As shown in FIG. 8, different portions of the animation 816 may be shown on the various display screens 810 and 812. For example, the front of the spaceship or dragon may appear on the display screen 810 for one EGM 502, while the back end of the spaceship or dragon may appear on the display screen 812 for another EGM 804.

As shown in configuration 800, the plurality of electronic gaming machines are positioned laterally in an oval configuration so that the animation 816 may travel from a first display the across all of the plurality of displays and return to the first display.

In the exemplary embodiment, the game display area 814 only covers a portion of the total display screen 810 and 812. The rest of the display screens 810 and 812 may be covered by background and animations 816. In some embodiments, the background and animations 816 are based on the game play. These images and animations 816 may be based on the game as a whole or the images and animations 816 may be based on the current events in the game. For example, the background may include a progressive jackpot indicator that covers multiple display screens 810 and 812. The progressive jackpot indicator may rotate around the display screens 810 and 812. The display screens 810 and 812 may also show items floating up to the progressive jackpot indicator based on game play. In addition, the display screens 810 and 812 may also show an animation of money being funneled or dumped into a particular gaming area if one of the EGMs 802 and 804 wins one of the progressive jackpots. In some embodiments, the display screens 810 and 812 may also display advertising provided by a remote server 102 (shown in FIG. 1).

FIG. 9 is an exemplary process 900 of executing an animation on a plurality of EGMS 300 shown in FIG. 3. In the exemplary embodiment, process 900 is executed by a central controller, such as central controller 602 (shown in FIG. 6). In the exemplary embodiment, central controller 602 is in communication with a plurality of EGMs 300, which may be in configurations, such as configuration 400 (shown in FIG. 4), configuration 800 (shown in FIG. 8), or any other configuration of adjacent EGMs 300 that allows the systems to work as described herein.

In the exemplary embodiment, the central controller 602 receives 905 a plurality of locations of a plurality of EGMs 300. In some embodiments, the EGM locations are provided by a user. In other embodiments, the central controller 602 determines the locations of the individual EGMs through network connections, network identifiers, or direct wired connections to specific ports of the central controller 602.

Using these plurality of locations, the central controller 602 determines 910 the relative locations of the plurality of EGMs 300 in relation to each other. The central controller 602 determines 910 which EGMs 300 are adjacent to each other and which direction each EGM 300 is in relation to the other EGMs 300.

In the exemplary embodiment, the central controller 602 determines 915 an animation to display on the plurality of EGMs 300. As described herein, the animation may be related to gameplay of the EGMs 300, may be advertising provided by a remote server 102 (shown in FIG. 1), and/or progressive jackpot information provided by the progressive system server 112 (shown in FIG. 1). The central controller 602 divides 920 the animation into a plurality of sections based on the plurality of relative locations of the plurality of displays of the plurality of EGMs 300. The central controller 602 determines which portions or sections of the animation to display on which display screen of which EGM 300.

In the exemplary embodiment, the central controller 602 generates 925 a plurality of instructions for displaying the animation on the plurality of backgrounds of the plurality of displays of the EGMs 300. In the exemplary embodiment, the central controller 602 generates 925 the instructions to allow the each of the EGMs 300 to display its portion of the animation. This includes instructions for ensuring that the displays of the various EGMs 300 are synced, so that the imagery may be displayed simultaneously and appear seamless to the observer. The central controller 602 transmits 930 the corresponding plurality of instructions to each of the plurality of EGMs 300, where the instructions instruct the EGM 300 on what to display on the display screen of the EGM 300.

In some embodiments, the game display areas 308 (shown in FIG. 3) are unaffected by the instructions for the display of the animation. In some embodiments, each EGM 300 includes a local controller 606 (shown in FIG. 6), where the central controller 602 is in communication with the local controller 606. The local controller 606 then uses the instructions to control its display 608 (shown in FIG. 6). In some embodiments, the central controller 602 is remote from the plurality of EGMs 300. In other embodiments, the central controller 602 is positioned adjacent or near to the EGMs 300 that it controls.

In some embodiments, the local controller 606 executes the wagering game on the game display area 308 of the corresponding electronic gaming machine 300. In these embodiments, the central controller 602 instructs the plurality of local controllers 606 on the background and the animation to be displayed. In other embodiments, the central controller 602 executes the wagering game for each of the plurality of electronic gaming machines 300.

Figure 10:
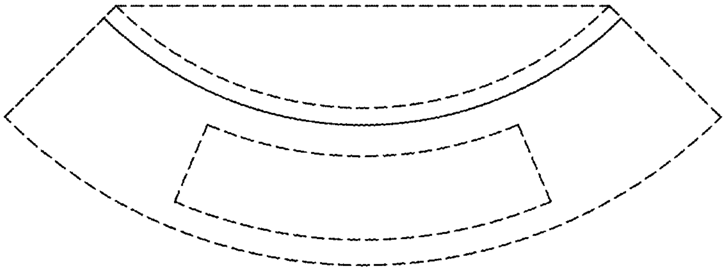
FIG. 10 is a top view of the individual EGM shown in FIG. 3.
Figure 11:
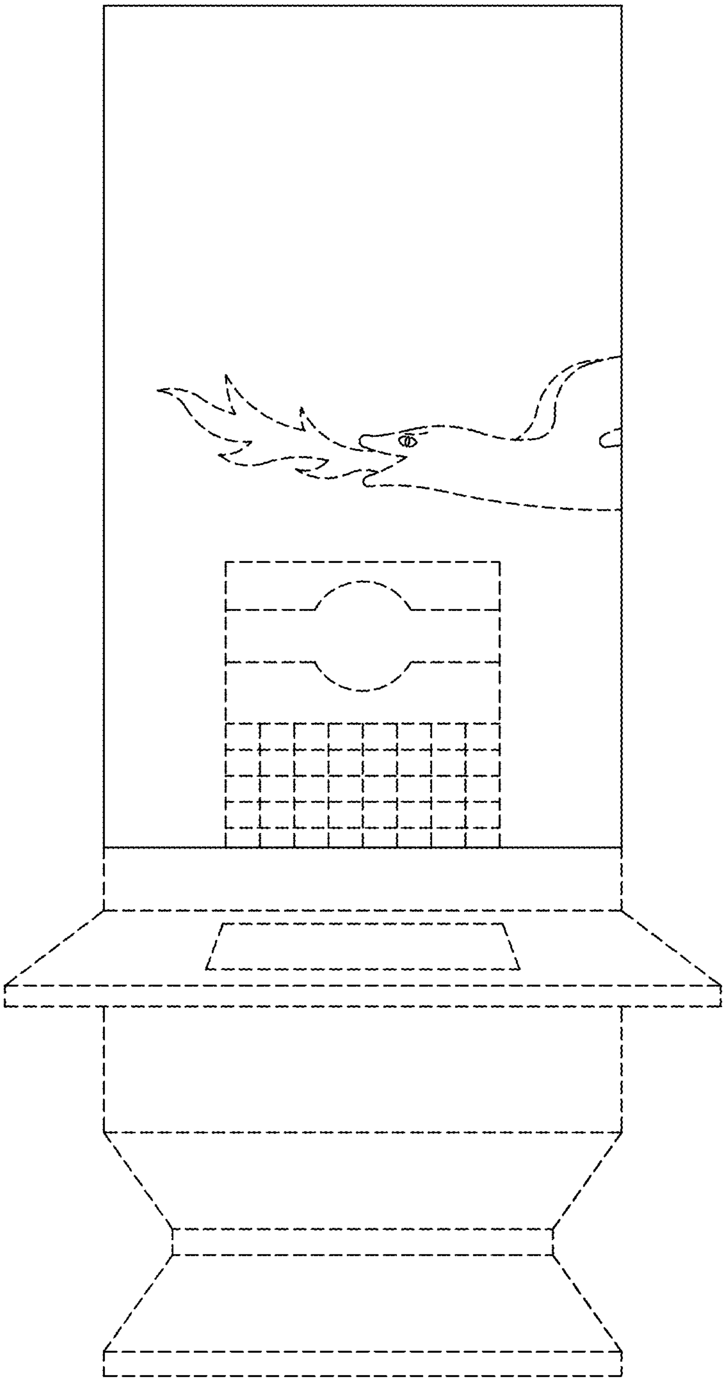
FIG. 11 is a front view of the individual EGM shown in FIG. 3.
Figure 12:
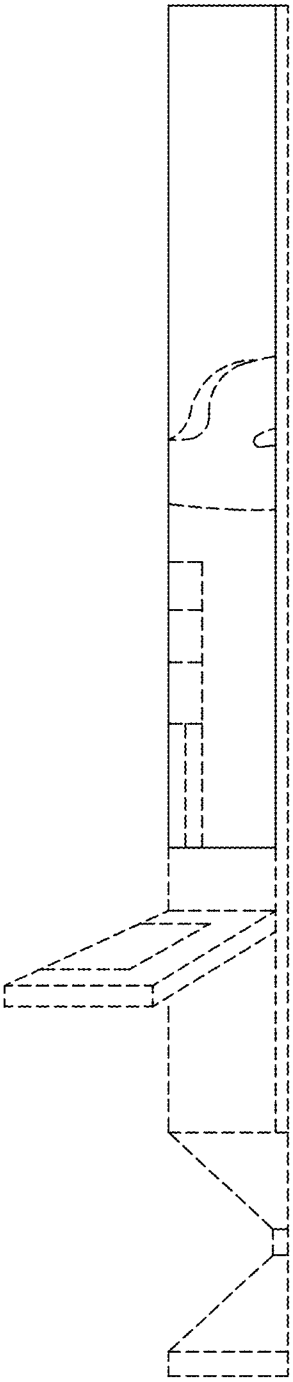
FIG. 12 is a side view of the individual EGM shown in FIG. 3.
Figure 13:
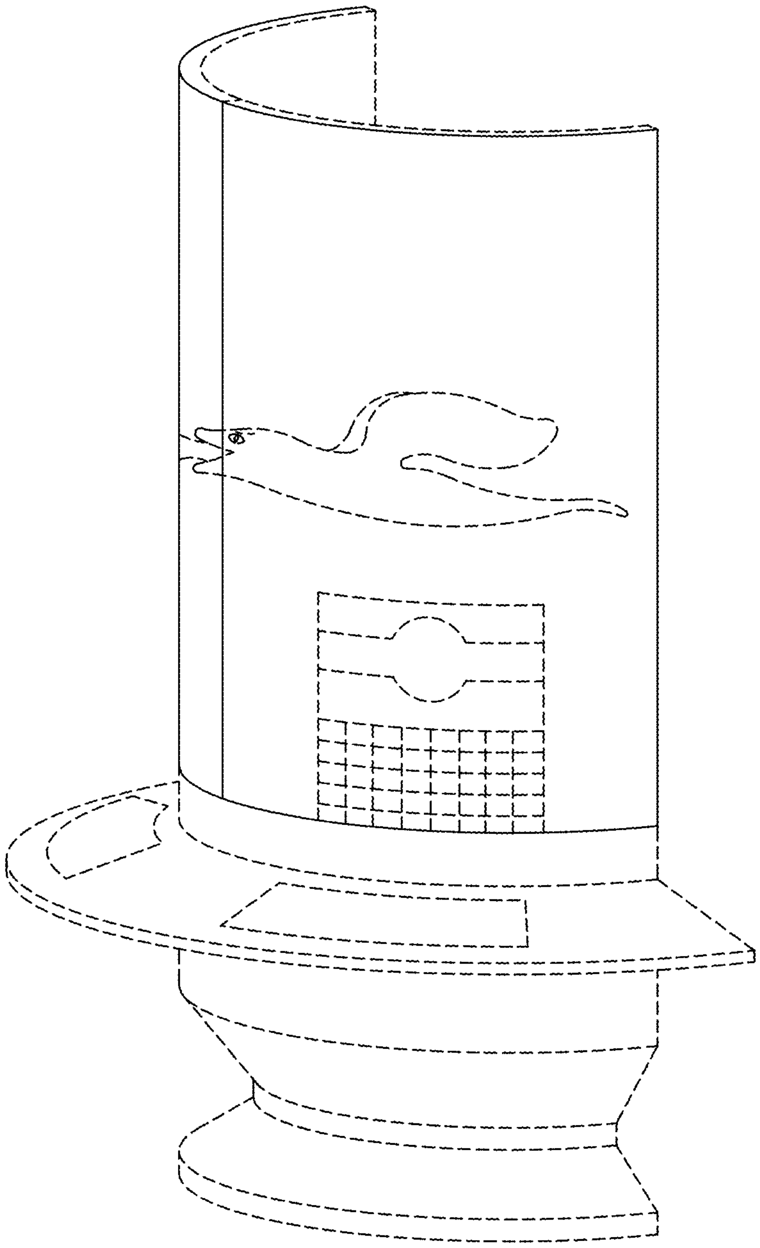
FIG. 13 is perspective view of the connected EGMs in the configuration shown in FIG. 4.
Figure 14:
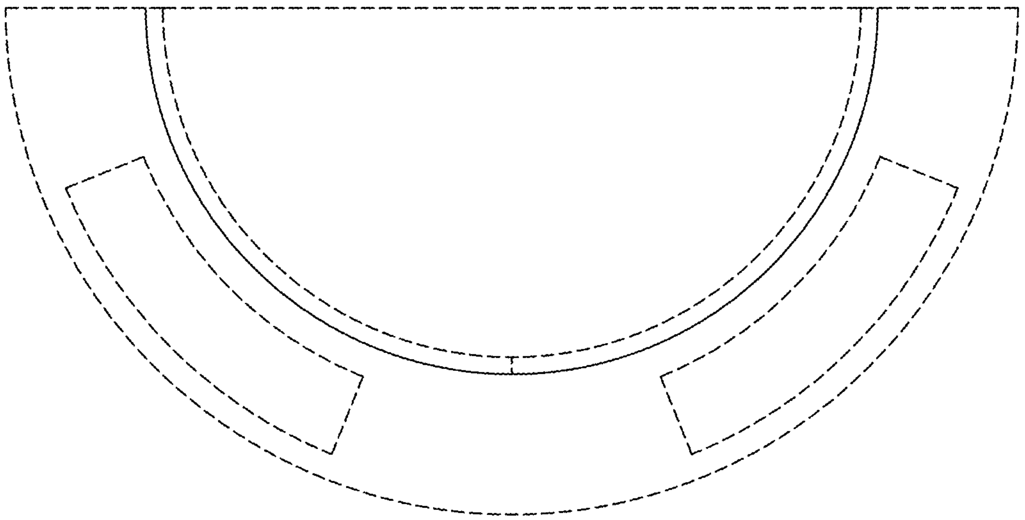
FIG. 14 is a top view of the connected EGMs in the configuration shown in FIG. 4.
Figure 15:
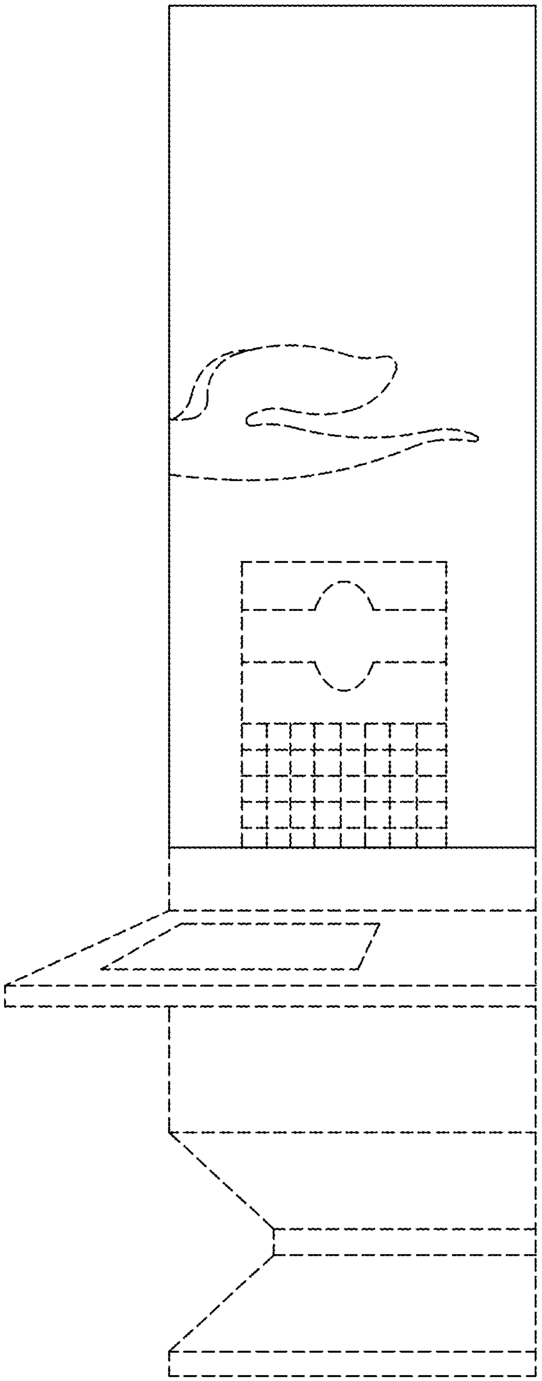
FIG. 15 is a side view of the connected EGMs in the configuration shown in FIG. 4.
Figure 16:
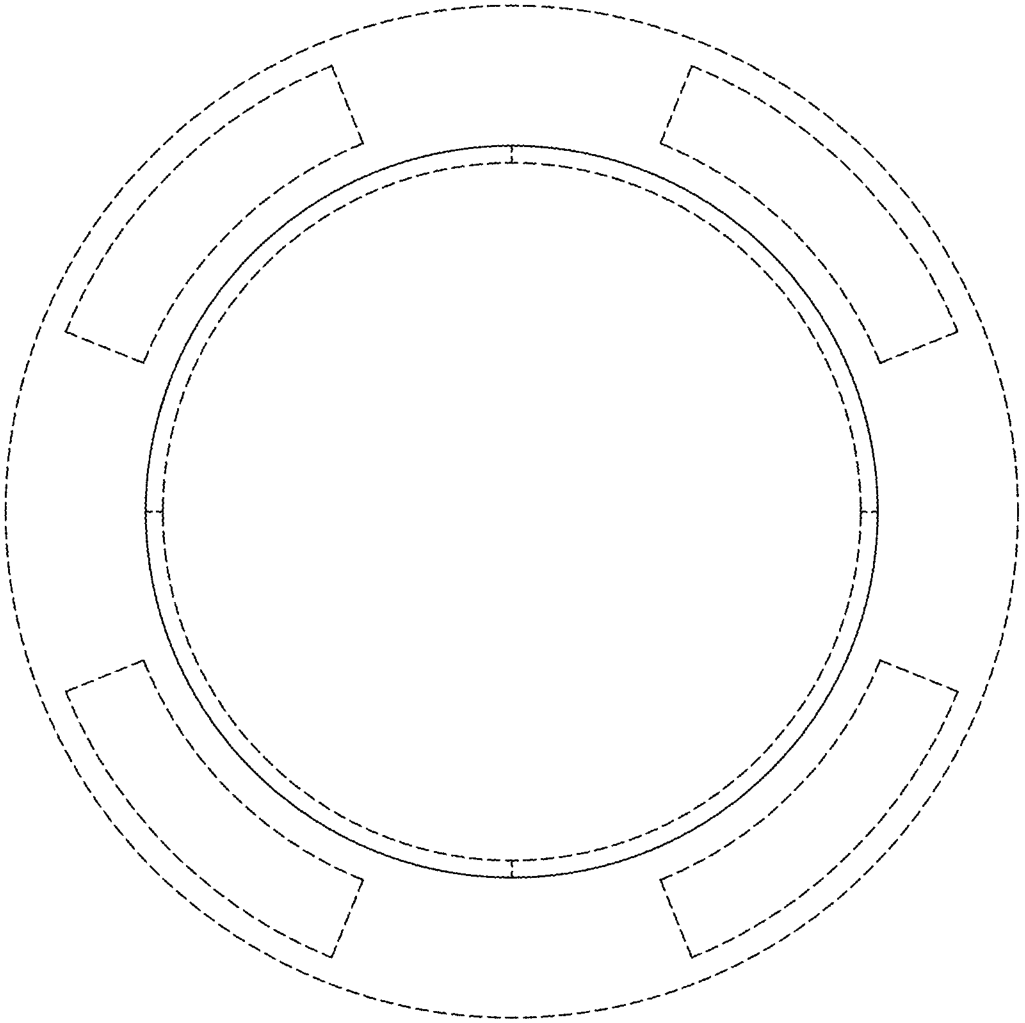
FIG. 16 is a top view of the connected EGMs in the configuration shown in FIG. 5.
Figure 17:
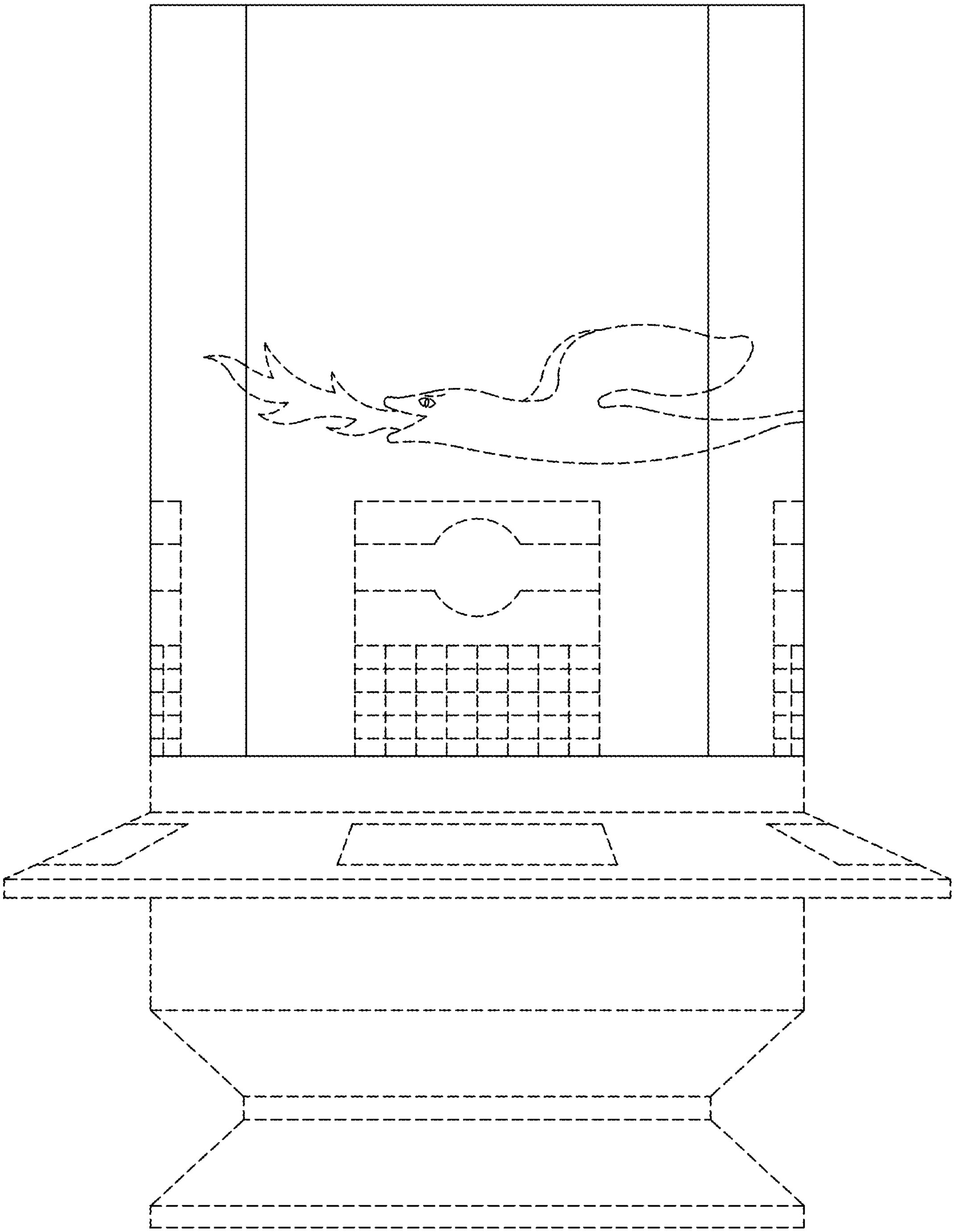
FIG. 17 is a front view of the connected EGMs in the configuration shown in FIG. 5.
Figure 18:
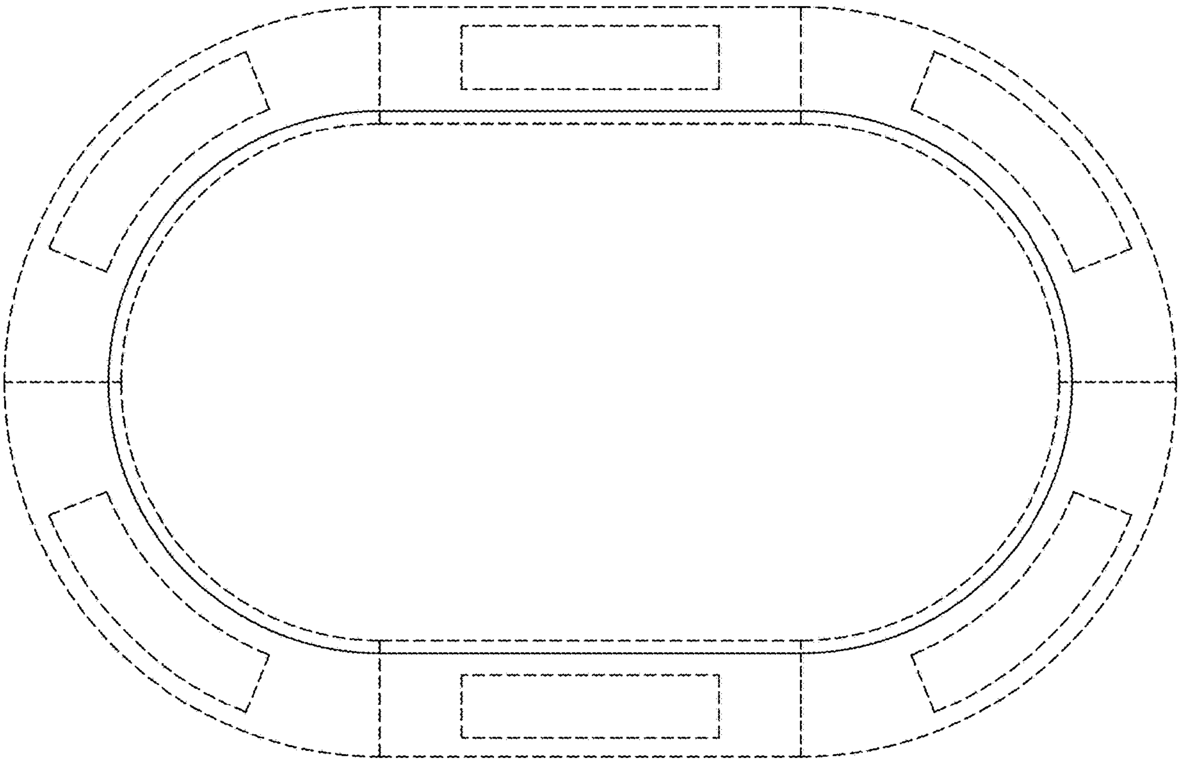
FIG. 18 is a top view of the connected EGMs in the configuration shown in FIG. 8.
Figure 19:
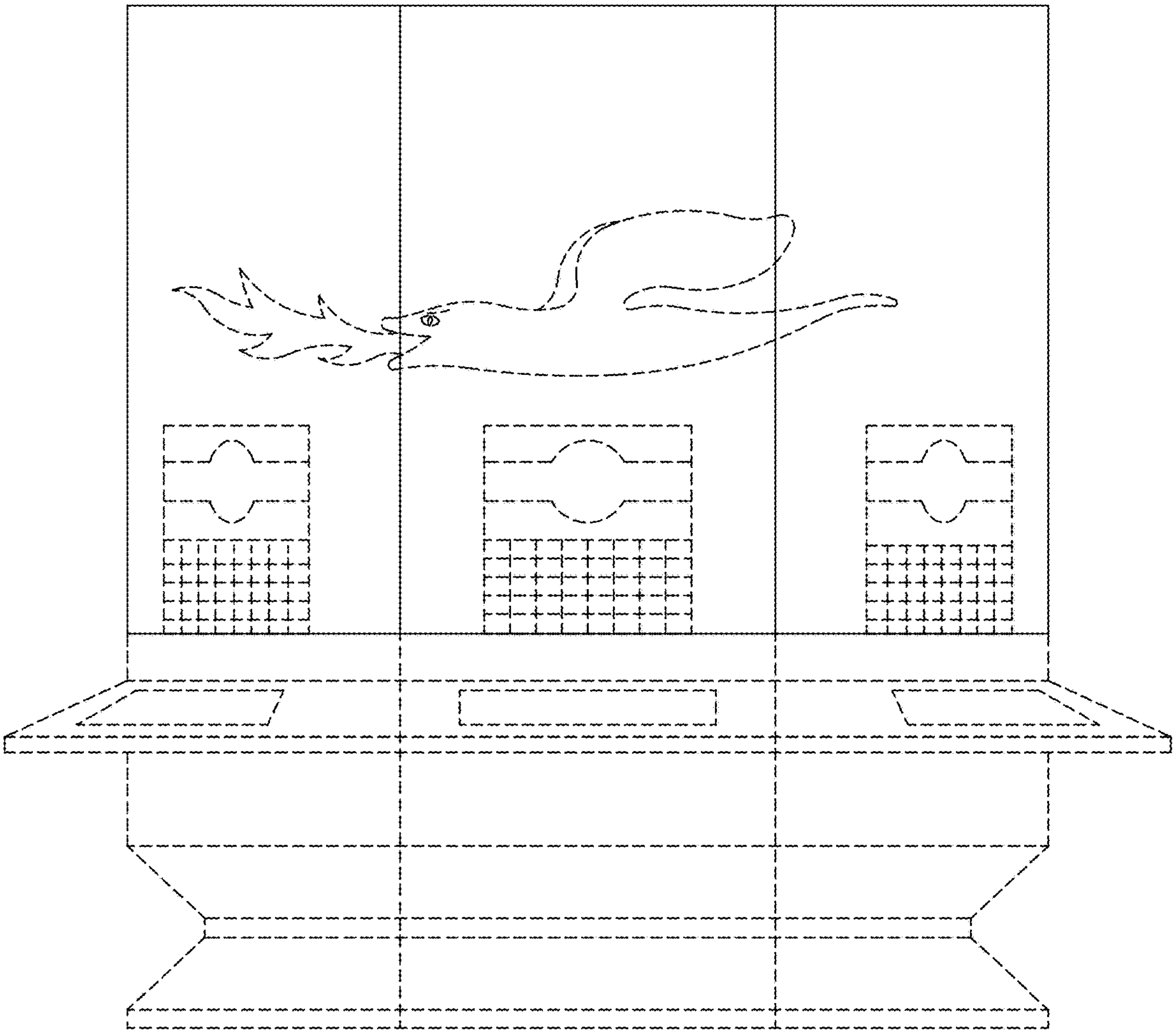
FIG. 19 is a front view of the connected EGMs in the configuration shown in FIG. 8.
Figure 20:
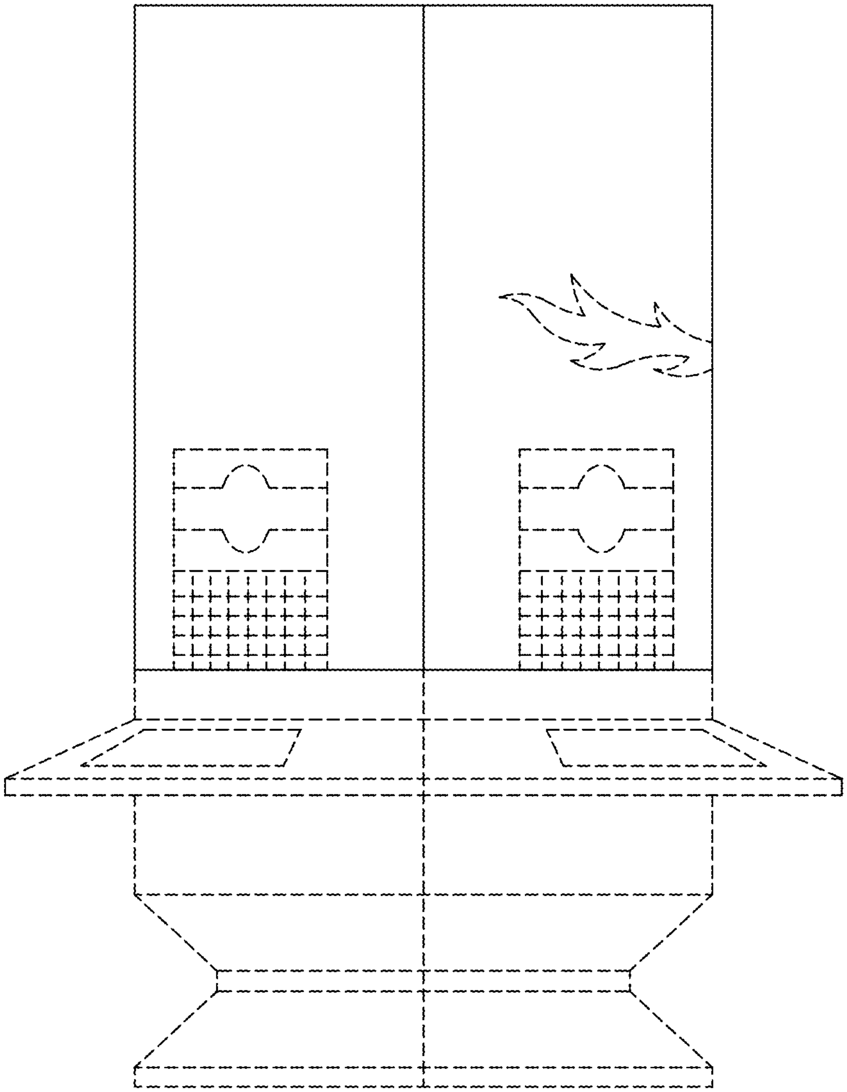
FIG. 20 is a side view of the connected EGMs in the configuration shown in FIG. 8.

FIG. 10 is a top view of the individual EGM 300 shown in FIG. 3. FIG. 11 is a front view of the individual EGM 300 shown in FIG. 3. FIG. 12 is a side view of the individual EGM 300 shown in FIG. 3. FIG. 13 is perspective view of the connected EGMs 300 in configuration 400 shown in FIG. 4. FIG. 14 is a top view of the connected EGMs 300 in configuration 400 shown in FIG. 4. FIG. 15 is a side view of the connected EGMs 300 in configuration 400 shown in FIG. 4. FIG. 16 is a top view of the connected EGMs 300 in configuration 500 shown in FIG. 5. FIG. 17 is a front view of the connected EGMs 300 in configuration 500 shown in FIG. 5. FIG. 18 is a top view of the connected EGMs 300 in configuration 800 shown in FIG. 8. FIG. 19 is a front view of the connected EGMs 300 in configuration 800 shown in FIG. 8. FIG. 20 is a side view of the connected EGMs 300 in configuration 800 shown in FIG. 8.

Figure 21:
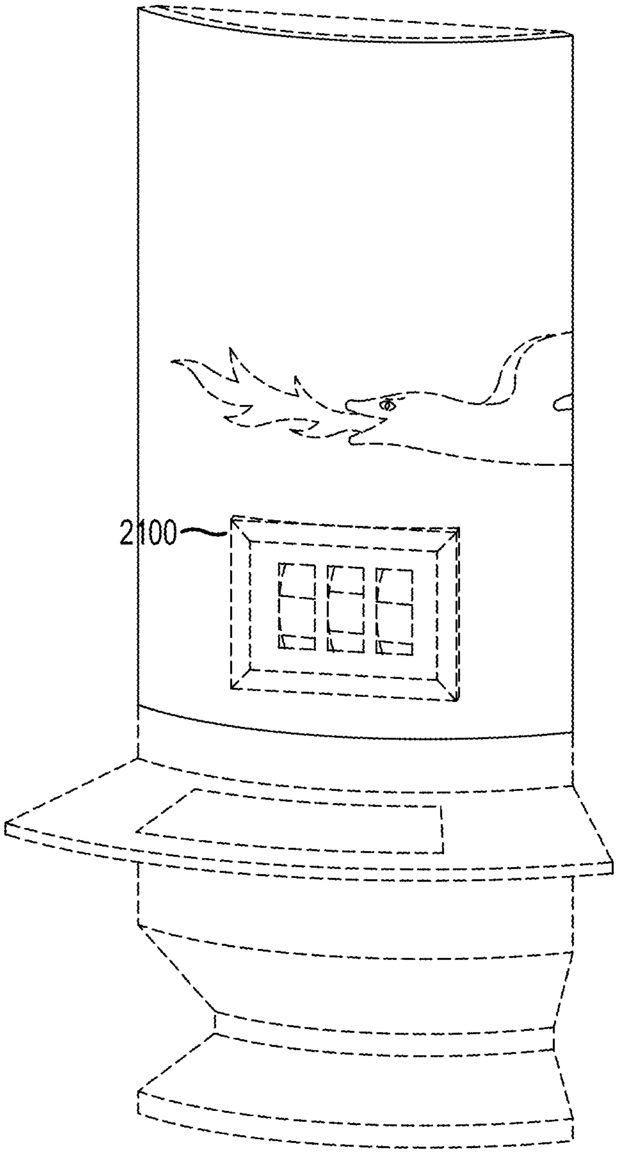
FIG. 21 is a perspective view of a single EGM including a stepper reel assembly.
Figure 22:
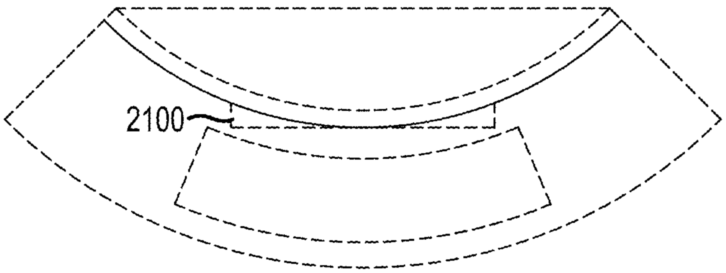
FIG. 22 is a top view of the single EGM with the stepper reel assembly.
Figure 23:
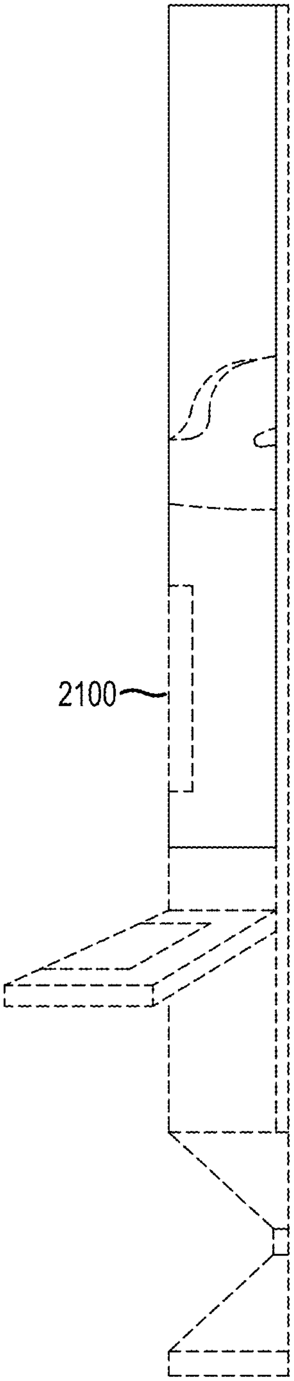
FIG. 23 is a side view of the single EGM with the stepper reel assembly.
Figure 24:
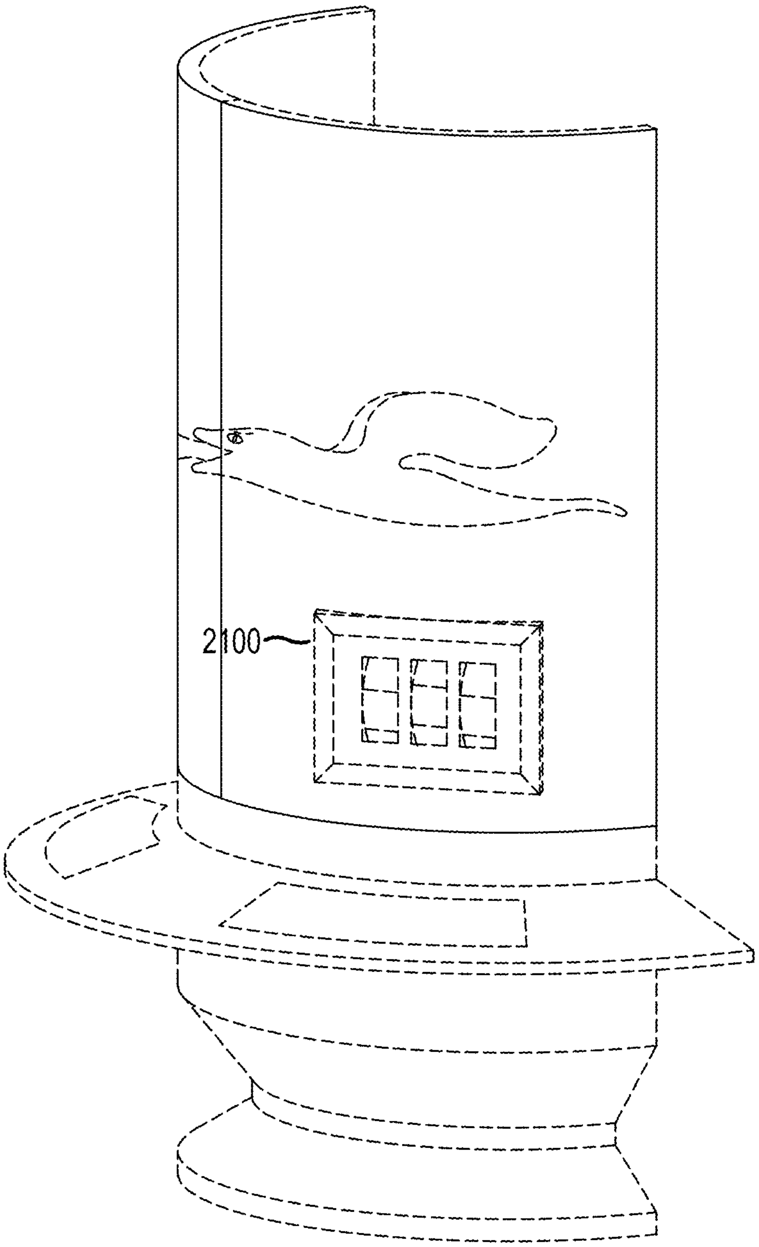
FIG. 24 is a perspective view of connected EGMs with stepper reel assemblies in the configuration shown in FIG. 4.
Figure 25:
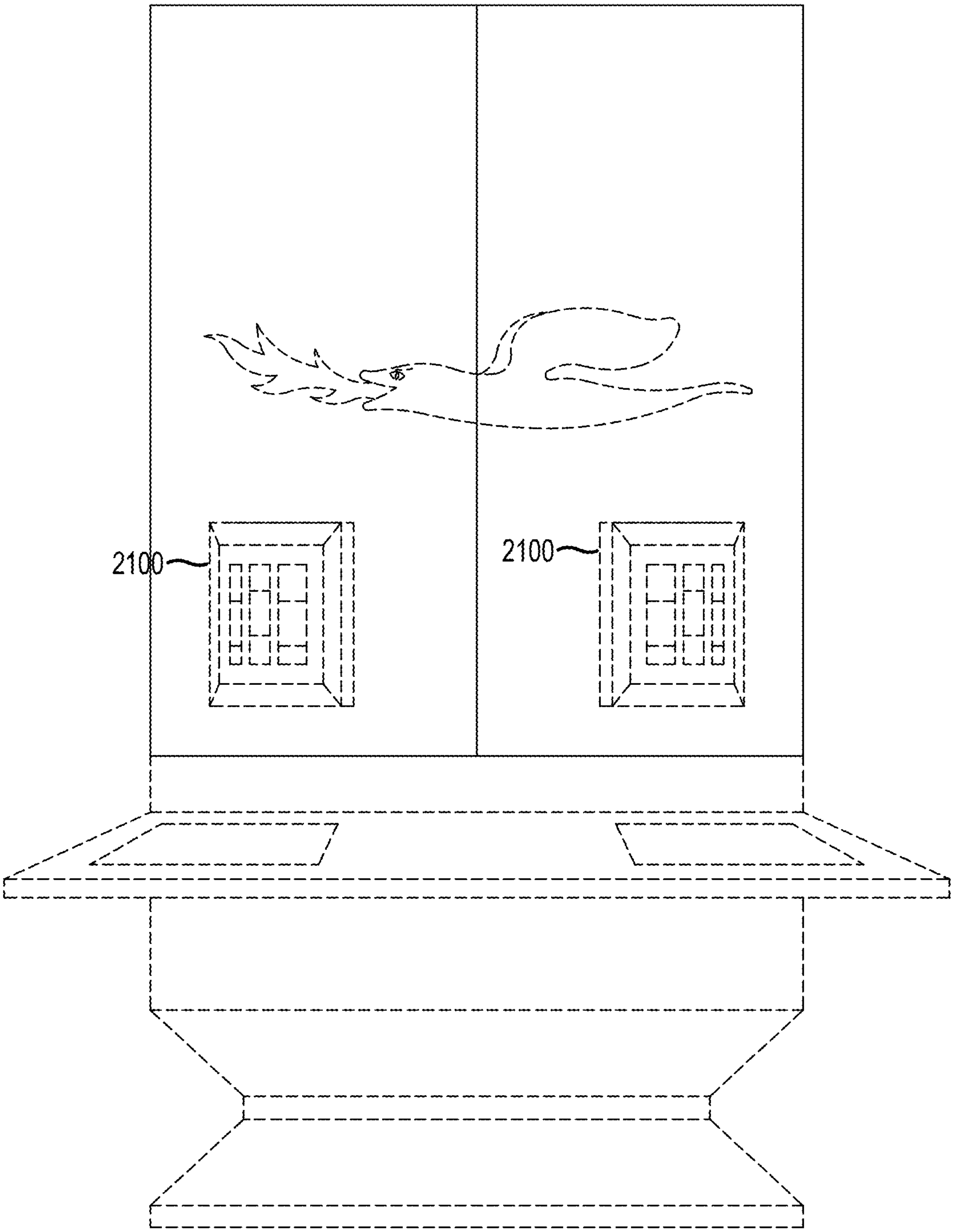
FIG. 25 is front view of the connected EGMs with stepper reel assemblies in the configuration shown in FIG. 4.
Figure 26:
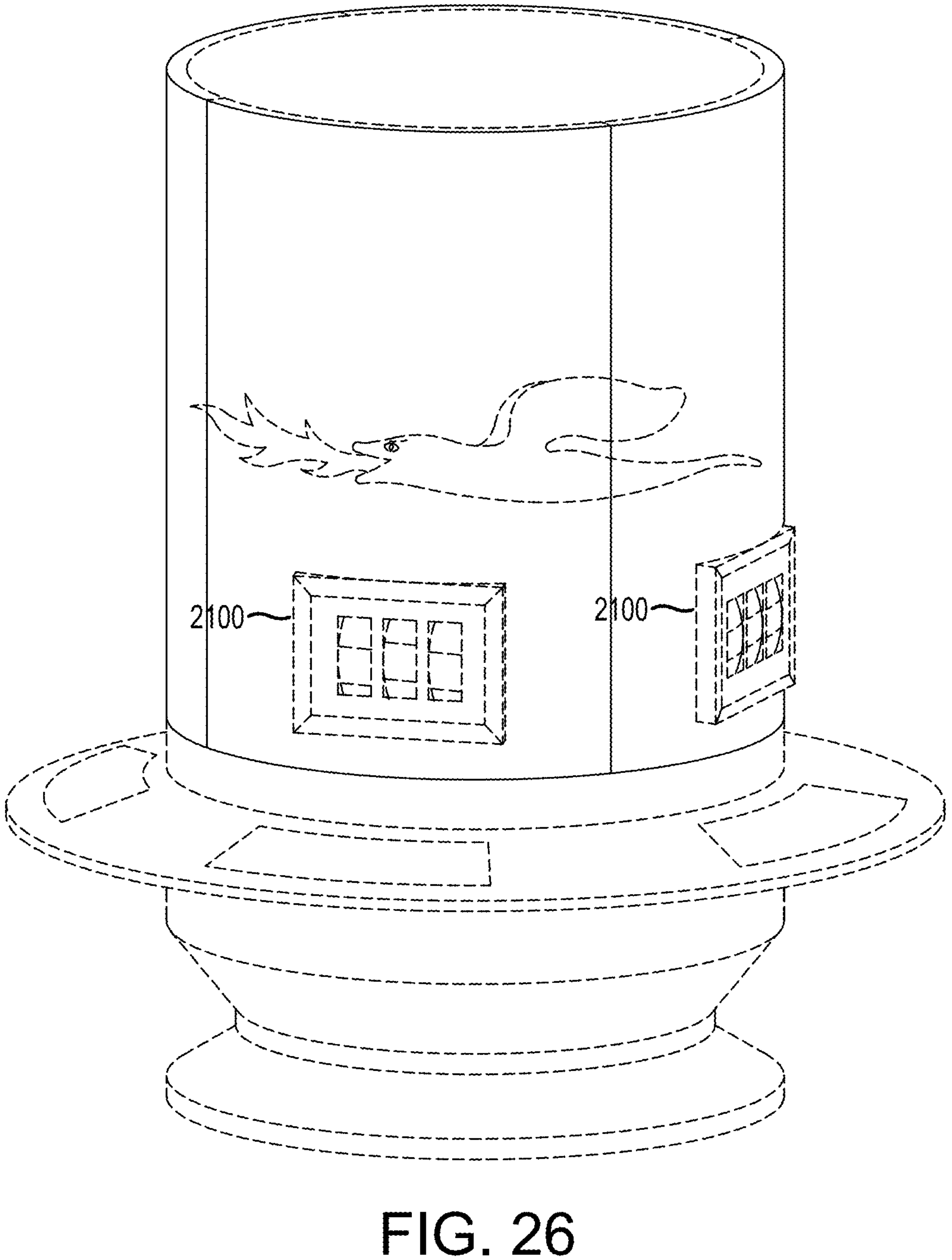
FIG. 26 is a perspective view of connected EGMs with stepper reel assemblies in the configuration shown in FIG. 8.

FIG. 21 is a perspective view of a single EGM 300 including a stepper reel assembly 2100. FIG. 22 is a top view of the single EGM 300 with the stepper reel assembly 2100. FIG. 23 is a side view of the single EGM 300 with the stepper reel assembly 2100. FIG. 24 is a perspective view of connected EGMs 300 in configuration 400 with stepper reel assemblies 2100. FIG. 25 is front view of the connected EGMs 300 in configuration 400 with stepper reel assemblies 2100. FIG. 26 is a perspective view of connected EGMs 300 in configuration 800 with stepper reel assemblies 2100. As shown in FIGS. 21-26, instead of being a part of a display screen, such as through picture-in-picture, the game display area 308 is a stepper reel assembly 2100 that is a cut-out from display screen 306. In these embodiments, the game display area 308 may comprise a flat surface, such as glass. Behind the flat surface are situated stepper (mechanical) reels 2100 for playing the wagering game. In these embodiments, the game display area 308 would be detachable for servicing, such as releasing with a latch situated below. In some embodiments, the game display area 308 and stepper reels 2100 are placed in a recess in the display screen 306 that includes drawer slides for servicing. In these embodiments, the display of the background and the animation 310 would be unaffected by the cut-out and game display area 308.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:
- a first electronic gaming device comprising a first curved display device;
- a second electronic gaming device comprising a second curved display device, wherein the first electronic gaming device is positioned adjacent to the second electronic gaming device laterally, and wherein the first curved display device and the second curved display device form a continuous curvature; and
- at least one processor that controls display of an animation moving between at least part of the first curved display device and the second curved display device.

2. The electronic gaming system of claim 1, further comprising:
- a third electronic gaming device comprising a third curved display device, wherein the third electronic gaming device is positioned adjacent to the first electronic gaming device laterally; and
- a fourth electronic gaming device comprising a fourth curved display device, wherein the fourth electronic gaming device is positioned adjacent to the second electronic gaming device laterally.

3. The electronic gaming system of claim 2, wherein the first electronic gaming device, the second electronic gaming device, the third electronic gaming device, and the fourth electronic gaming device form a circle shape.

4. The electronic gaming system of claim 1, further comprising:
- a third electronic gaming device comprising a first flat display device, wherein the third electronic gaming device is positioned adjacent to the first electronic gaming device laterally; and
- a fourth electronic gaming device comprising a second flat display device, wherein the fourth electronic gaming device is positioned adjacent to the second electronic gaming device laterally.

5. The electronic gaming system of claim 4, further comprising:
- a fifth electronic gaming device comprising a third curved display device, wherein the fifth electronic gaming device is positioned adjacent to the third electronic gaming device laterally; and
- a sixth electronic gaming device comprising a fourth curved display device, wherein the sixth electronic gaming device is positioned adjacent to the fourth electronic gaming device laterally.

6. The electronic gaming system of claim 1, wherein the first electronic gaming device and the second electronic gaming device have a shared base.

7. The electronic gaming system of claim 1, wherein the animation is associated with at least one of a theme of an electronic game, a progressive jackpot, an advertisement, or a promotion.

8. The electronic gaming system of claim 1, wherein the at least one processor is configured to cause display of the animation in response to receiving a message associated with the animation from a server.

9. The electronic gaming system of claim 1, wherein the first electronic gaming device and the second electronic gaming device form a half-circle shape.

10. An electronic gaming device comprising:
- a base;
- a first curved display device coupled to the base;
- a second curved display device coupled to the base, wherein the first curved display device is positioned adjacent to the second curved display device laterally, and wherein the first curved display device and the second curved display device form a continuous curvature; and
- at least one processor that controls display of an animation moving between at least part of the first curved display device and the second curved display device.

11. The electronic gaming device of claim 10, further comprising:
- a third curved display device, wherein the third curved display device is positioned adjacent to the first curved display device laterally; and
- a fourth curved display device, wherein the fourth curved display device is positioned adjacent to the second curved display device laterally.

12. The electronic gaming device of claim 11, wherein the first curved display device, the second curved display device, the third curved display device, and the fourth curved display device form a circle shape.

13. The electronic gaming device of claim 10, further comprising:
- a first flat display device positioned adjacent to the first curved display device laterally; and
- a second flat display device positioned adjacent to the second curved display device laterally.

14. The electronic gaming device of claim 13, further comprising:
- a third curved display device positioned adjacent to the first flat display device laterally; and
- a fourth curved display device positioned adjacent to the second flat display device laterally.

15. The electronic gaming device of claim 10, wherein the animation is associated with at least one of a theme of an electronic game, a progressive jackpot, an advertisement, or a promotion.

16. The electronic gaming device of claim 10, wherein the at least one processor is configured to cause display of the animation in response to receiving a message associated with the animation from a server.

17. The electronic gaming device of claim 10, wherein the first curved display device and the second curved display device form a half-circle shape.

18. A method of assembling an electronic gaming system comprising:
- providing a first electronic gaming device comprising a first curved display device;
- providing a second electronic gaming device comprising a second curved display device; and
- positioning the first electronic gaming device adjacent to the second electronic gaming device laterally, wherein the first curved display device and the second curved display device form a continuous curvature, and wherein at least one processor controls display of an animation moving between at least part of the first curved display device and the second curved display device.

19. The method of claim 18, further comprising:

providing a third electronic gaming device comprising a third curved display device;

positioning the third electronic gaming device adjacent to the first electronic gaming device laterally;

providing a fourth electronic gaming device comprising a fourth curved display device; and positioning the fourth electronic gaming device adjacent to the second electronic gaming device laterally.

20. The method of claim 18, further comprising:

providing a third electronic gaming device comprising a first flat display device;

positioning the third electronic gaming device adjacent to the first electronic gaming device laterally;

providing a fourth electronic gaming device comprising a second flat display device;

positioning the fourth electronic gaming device adjacent to the second electronic gaming device laterally;

providing a fifth electronic gaming device comprising a third curved display device;

positioning the fifth electronic gaming device adjacent to the third electronic gaming device laterally;

providing a sixth electronic gaming device comprising a fourth curved display device; and positioning the sixth electronic gaming device adjacent to the fourth electronic gaming device laterally.

* * * * *